US010419753B2

(12) United States Patent
Akie et al.

(10) Patent No.: US 10,419,753 B2
(45) Date of Patent: Sep. 17, 2019

(54) SEMICONDUCTOR DEVICE, MOVING IMAGE PROCESSING SYSTEM, METHOD OF CONTROLLING SEMICONDUCTOR DEVICE

(71) Applicant: RENESAS ELECTRONICS CORPORATION, Tokyo (JP)

(72) Inventors: Kazushi Akie, Tokyo (JP); Seiji Mochizuki, Tokyo (JP); Toshiyuki Kaya, Tokyo (JP); Katsushige Matsubara, Tokyo (JP); Hiroshi Ueda, Tokyo (JP); Ren Imaoka, Tokyo (JP); Ryoji Hashimoto, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 22 days.

(21) Appl. No.: 15/699,801

(22) Filed: Sep. 8, 2017

(65) Prior Publication Data
US 2018/0077413 A1    Mar. 15, 2018

(30) Foreign Application Priority Data
Sep. 12, 2016  (JP) ................. 2016-177759

(51) Int. Cl.
*H04N 19/107* (2014.01)
*H04N 19/105* (2014.01)
(Continued)

(52) U.S. Cl.
CPC ........... *H04N 19/107* (2014.11); *G06T 9/007* (2013.01); *H04N 19/105* (2014.11);
(Continued)

(58) Field of Classification Search
CPC .... H04N 19/147; H04N 19/593; H04N 19/90; H04N 19/94
(Continued)

(56) References Cited

U.S. PATENT DOCUMENTS

| 5,710,590 A * | 1/1998 | Ichige ................. G06T 9/001 348/14.01 |
| 6,408,127 B1 * | 6/2002 | Kubo ................... H04N 5/45 348/E5.112 |

(Continued)

FOREIGN PATENT DOCUMENTS

JP    2009-194920 A    8/2009

*Primary Examiner* — Yosef Kassa
(74) *Attorney, Agent, or Firm* — McDermott Will & Emery LLP

(57) ABSTRACT

A display area can be smoothly moved.
A semiconductor device sequentially receives a plurality of whole images, each of which includes a plurality of small screen images and which are temporally continuous and form a moving image, and decodes a received whole image. Here, the semiconductor device includes a reception unit that receives the whole image including the small screen images, a determination unit that determines a decoding area which includes a small screen image to be decoded and which is included in the whole image, and a decoding unit that decodes the small screen image in the decoding area which is determined by the determination unit and which is included in the whole image. The determination unit determines a new decoding area when a small screen image of intra frame appears in the decoding area.

14 Claims, 24 Drawing Sheets

(51) Int. Cl.
*H04N 19/122* (2014.01)
*H04N 19/17* (2014.01)
*H04N 19/436* (2014.01)
*H04N 19/44* (2014.01)
*H04N 19/573* (2014.01)
*G06T 9/00* (2006.01)
*H04N 21/4728* (2011.01)
*H04N 21/81* (2011.01)

(52) U.S. Cl.
CPC .......... *H04N 19/122* (2014.11); *H04N 19/17* (2014.11); *H04N 19/436* (2014.11); *H04N 19/44* (2014.11); *H04N 19/573* (2014.11); *H04N 21/4728* (2013.01); *H04N 21/816* (2013.01)

(58) Field of Classification Search
USPC ....... 382/166, 206, 233, 236, 238, 243, 248, 382/278, 286, 293, 298; 358/537, 539, 358/426.04, 426.07
See application file for complete search history.

(56) References Cited

U.S. PATENT DOCUMENTS

| | | | | |
|---|---|---|---|---|
| 7,161,983 | B2* | 1/2007 | Lainema | H04N 19/147 348/699 |
| 7,406,202 | B2* | 7/2008 | Kodama | H04N 19/176 375/E7.072 |
| 7,650,036 | B2* | 1/2010 | Lei | H04N 19/597 345/10 |
| 7,657,111 | B2* | 2/2010 | Nonaka | H04N 1/00212 375/240.25 |
| 8,038,700 | B2* | 10/2011 | Colleran | A61B 17/7025 606/246 |
| 8,132,211 | B2* | 3/2012 | Yamaguchi | G11B 27/105 725/61 |
| 8,334,818 | B2* | 12/2012 | Templier | G06F 3/1446 345/1.1 |
| 8,787,460 | B1* | 7/2014 | Hobbs | H04N 19/00 375/240.16 |
| 2014/0321556 | A1* | 10/2014 | Xiao | H04N 19/70 375/240.26 |

* cited by examiner

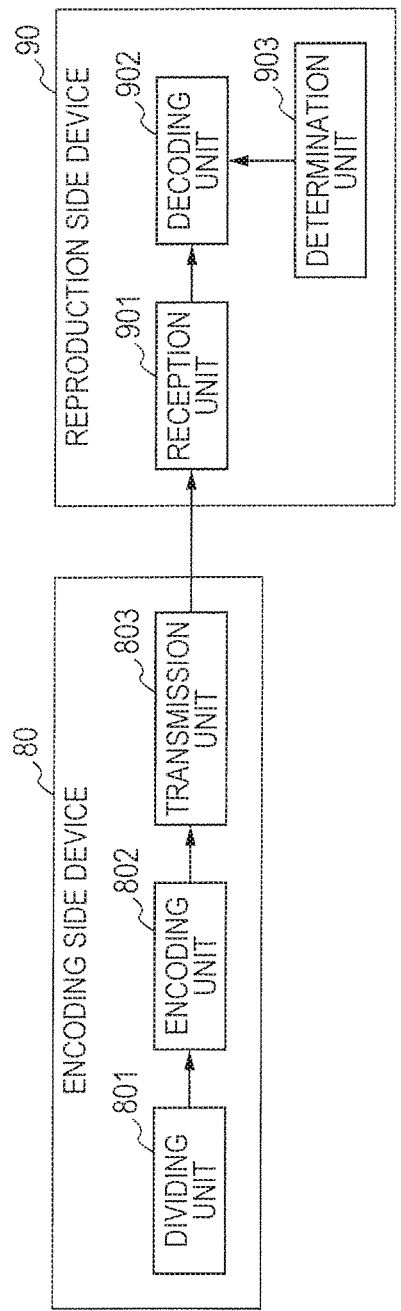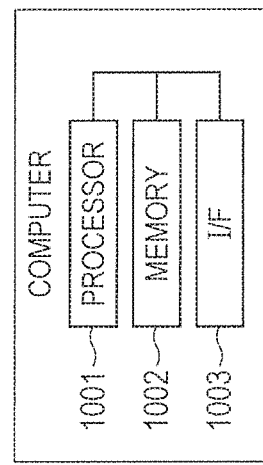

SEMICONDUCTOR DEVICE, MOVING IMAGE PROCESSING SYSTEM, METHOD OF CONTROLLING SEMICONDUCTOR DEVICE

CROSS-REFERENCE TO RELATED APPLICATIONS

The disclosure of Japanese Patent Application No. 2016-177759 filed on Sep. 12, 2016 including the specification, drawings and abstract is incorporated herein by reference in its entirety.

BACKGROUND

The present invention relates to a semiconductor device, a moving image processing system, and a method of controlling a semiconductor device. For example, the present invention can be preferably used for a semiconductor device that processes a moving image.

In recent years, a 360-degree camera that captures a whole image around the camera by one-time image capturing has been well developed and the number of cases where a reproduction side device decodes and displays a 360-degree moving image captured by the 360-degree camera has increased. However, the reproduction side device is a smartphone or the like, so that a screen of a display unit is small and an entire moving image may not be displayed.

Therefore, there is a reproduction side device that cuts out a part of an area of a moving image as a display area and displays an image in the display area. Further, there is a reproduction side device that can move a display area that is cut out from a moving image.

As a related art, there is Japanese Unexamined Patent Application Publication. No. 2009-194920. A technique described in Japanese Unexamined Patent Application Publication No. 2009-194920 divides a panoramic image into a plurality of small screen images (tiles) and independently encodes each of the plurality of small screen images.

SUMMARY

Here, it is assumed that, in the technique described in Japanese Unexamined Patent Application Publication No. 2009-194920, when, the reproduction side device defines one of a plurality of small screen images as a display area and has decoded and displayed the small screen image, the reproduction side device moves the display area to an adjacent small screen image.

At this time, the small screen image of the moving destination is not decoded, so that the small screen image is required to be immediately decoded. Further, at this time, if the small screen image of the moving destination is other than an I (intra) frame, the small screen image is required to be decoded by referring to an I frame immediately before or immediately after the small screen image. However, when decoding the small screen image by referring to an I frame immediately before the small screen image, it is required to decode a plurality of frames, so that it takes time until displaying the small screen image of the moving destination. Further, when decoding the small screen image by referring to an I frame immediately after the small screen image, it is required to delay the display of the small screen image of the moving destination to the I frame immediately after the small screen image.

As described above, the technique described in Japanese Unexamined Patent Application Publication No. 2009-194920 has a problem that, when moving the display area to an adjacent small screen image, if the small screen image of the moving destination is other than an I frame, it takes time until displaying the small screen image of the moving destination and it is not possible to smoothly move the display area. The above problem is not only a problem for the 360-degree moving image and the panoramic image, but also a common problem for a configuration in which an image in a display area is displayed while the display area which is cut out from a moving image is being moved.

The other problems and novel features will become apparent from the description of the present specification and the accompanying drawings.

According to an embodiment, a semiconductor device includes a reception unit that receives a whole image, a determination unit that determines a decoding area which includes a small screen image to be decoded and which is included in the whole image, and a decoding unit that decodes the small screen image in the decoding area which is determined by the determination unit and which is included in the whole image, and the determination unit determines a new decoding area when a small screen image of intra frame appears in the decoding area.

According to the embodiment described above, it is possible to contribute to solving the problem described above.

BRIEF DESCRIPTION OF THE DRAWINGS

FIG. 26 is a diagram showing a configuration example of a moving image processing system, which conceptually shows the first to the fifth embodiments.

FIG. 27 is a block diagram showing an encoding side device, a reproduction side device, and a hardware configuration that realizes a reproduction side device according to the embodiments.

DETAILED DESCRIPTION

Figure 1:
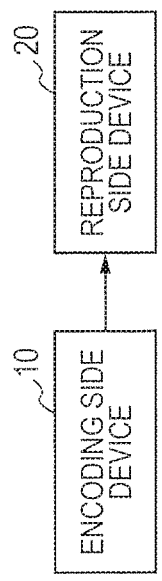
FIG. 1 is a diagram showing a configuration example of a moving image processing system according to a first embodiment.

Hereinafter, embodiments will be described. For clarity of explanation, the following description and drawings are appropriately omitted and simplified. In the drawings, the same components are denoted by the same reference symbols and redundant description is omitted.

(1) First Embodiment (1-1) Configuration of First Embodiment

<Configuration of Moving Image Processing System According to First Embodiment>

Hereinafter, a configuration of a first embodiment will be described. First, a configuration example of a moving image processing system according to the first embodiment will be described with reference to FIG. 1. As shown in FIG. 1, the moving image processing system according to the first embodiment includes an encoding side device 10 and a reproduction side device 20.

The encoding side device 10 generates encoded data from a moving image and transmits the generated encoded data to the reproduction side device 20. The reproduction side device 20 receives the encoded data from the encoding side device 10 and reproduces and displays a part of a moving image that is the source of the received encoded data. Thereby, a user can see a moving image displayed on the reproduction side device 20.

<Configuration of Encoding Side Device 10 According to First Embodiment>

Figure 2:
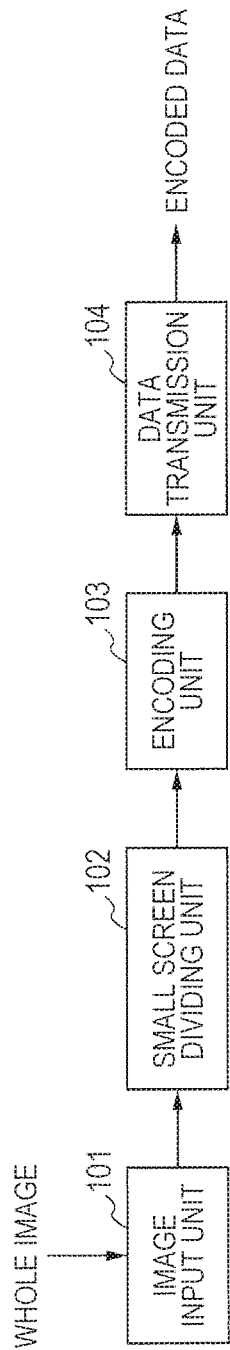
FIG. 2 is a block diagram showing a configuration example of an encoding side device 10 according to the first embodiment.

Subsequently, a configuration example of the encoding side device 10 according to the first embodiment will be described with reference to FIG. 2. As shown in FIG. 2, the encoding side device 10 according to the first embodiment includes an image input unit 101, a small screen dividing unit 102, an encoding unit 103, and a data transmission unit 104. Configuration components of the encoding side device 10 can be realized by a semiconductor device. The small screen dividing unit 102 is an example of a dividing unite. The data transmission unit 104 is an example of a transmission unit.

A plurality of temporally continuous images (hereinafter, each image is referred to as a whole image as appropriate) included in a moving image, which is a 360-degree moving image or the like, is sequentially inputted into the image input unit 101. For example, the whole image is inputted into the image input unit 101 from a camera (not shown in the drawings) or the like.

The small screen dividing unit 102 divides the whole image, which is inputted into the image input unit 101, into a plurality of small screen images. Here, the size of the small screen image is the same as the size of a unit of encoding, which is a unit where the encoding unit 103 performs encoding. The size of the unit of encoding is determined by the encoding side device 10 according to an encoding efficiency of the encoding unit 103 and a screen size of a display unit 206 (see FIG. 3) of the reproduction side device 20. The size of the unit of encoding may be determined by a request from the reproduction side device 20.

The encoding unit 103 encodes each of the plurality of small screen images divided by the small screen dividing unit 102. Here, the encoding unit 103 encodes a small screen image as an I frame at a constant time interval and encodes a small screen image, which is not encoded as an I frame, as a P frame or a B (Bi-directional Predicted) frame by referring to an I frame or a P (Predicted) frame immediately before or immediately after the small screen image.

The data transmission unit 104 transmits encoded data of each of the plurality of small screen images encoded by the encoding unit 103 to the reproduction side device 20.

In the way described above, every time the whole image is inputted into the image input unit 101, the encoding side device 10 transmits encoded data of each of the plurality of small screen images obtained by dividing the whole image to the reproduction side device 20.

<Configuration of Reproduction Side Device 20 According to First Embodiment>

Figure 3:
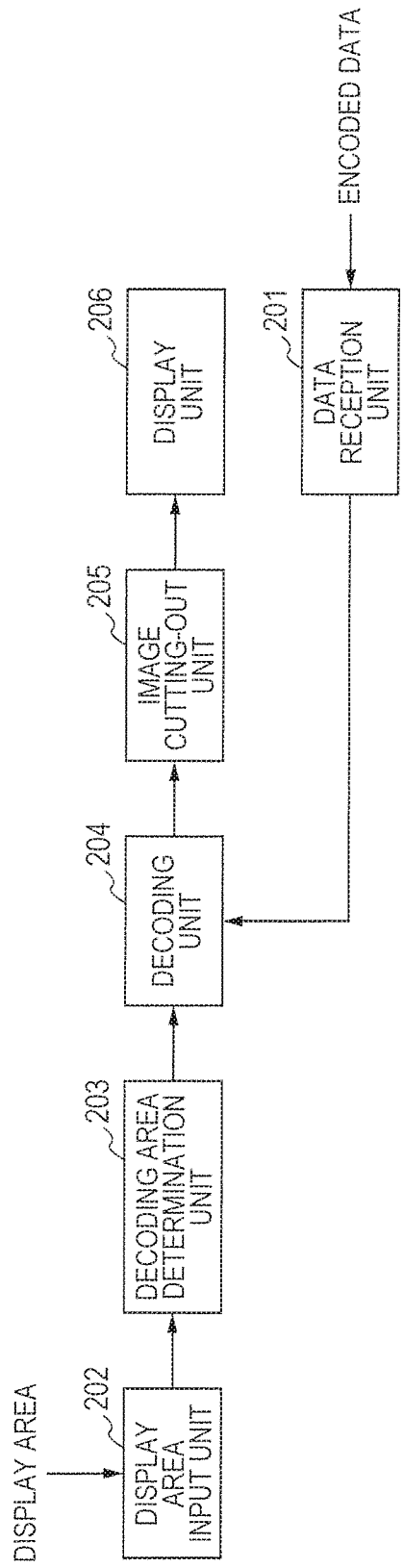
FIG. 3 is a block diagram showing a configuration example of a reproduction side device 20 according to the first embodiment.

Subsequently, a configuration example of the reproduction side device 20 according to the first embodiment will be described with reference to FIG. 3. As shown in FIG. 3, the reproduction side device 20 according to the first embodiment includes a data reception unit 201, a display area input unit 202, a decoding area determination unit 203, a decoding unit 204, an image cutting-out unit 205, and a display unit

206. Configuration components of the reproduction side device 20 other than the display unit 206 can be realized by a semiconductor device. The data reception unit 201 is an example of a reception unit. The display area input unit 202 is an example of an input unit. The decoding area determination unit 203 is an example of a determination unit.

The data reception unit 201 receives encoded data of each of the plurality of small screen images divided from the whole image from the encoding side device 10.

An instruction of a display area including an image which is included in the whole image and is to be displayed by the display unit 206 is inputted into the display area input unit 202. The display area is an area which a user specifies by a position corresponding to the display area in the whole image and a size of the display area, and the display area is inputted into the display area input unit 202 through an input device (not shown in the drawings) such as a touch panel and a keyboard.

The decoding area determination unit 203 determines a decoding area including small screen images, which is included in the whole image and is to be decoded by the decoding unit 204, based on the display area inputted into the display area input unit 202. The decoding area includes a current display area and a margin area of the current display area. The size of the decoding area is any integral multiple of the size of a unit of encoding.

The decoding unit 204 decodes an image which is included in the whole image received by the data reception unit 201 as the encoded data and which is further included in the decoding area determined by the decoding area determination unit 203. Thereby, an original image in the decoding area is obtained.

The image cutting-out unit 205 cuts out an image in the display area inputted into the display area input unit 202 from the image decoded by the decoding unit 204.

The display unit 206 displays the image cut out by the image cutting-out unit 205.

In this way, the reproduction side device 20 cuts out and displays an image in the current display area inputted by a user from the whole image and displays the image. The reproduction side device 20 repeats the above operation. Therefore, the user can see a moving image in the display area while moving the display area.

Information transmitted from the encoding side device 10 to the reproduction side device 20 is basically encoded data that is obtained by encoding small screen images. However, the encoding side device 10 may transmit management information and control information of the encoded data, motion information of an object in a moving image, and the like.

(1-2) Operation of First Embodiment

Hereinafter, an operation of the first embodiment will be described. In the description below, for ease of description, it is assumed that the encoding side device 10 divides the whole image into small screen images only in the horizontal direction.

<Overview of Operation Example of Encoding Side Device 10 and Reproduction Side Device 20 According to First Embodiment>

First, an overview of an operation example of the encoding side device 10 and the reproduction side device 20 according to the first embodiment will be described with reference to FIGS. 4 and 5.

Figure 4:
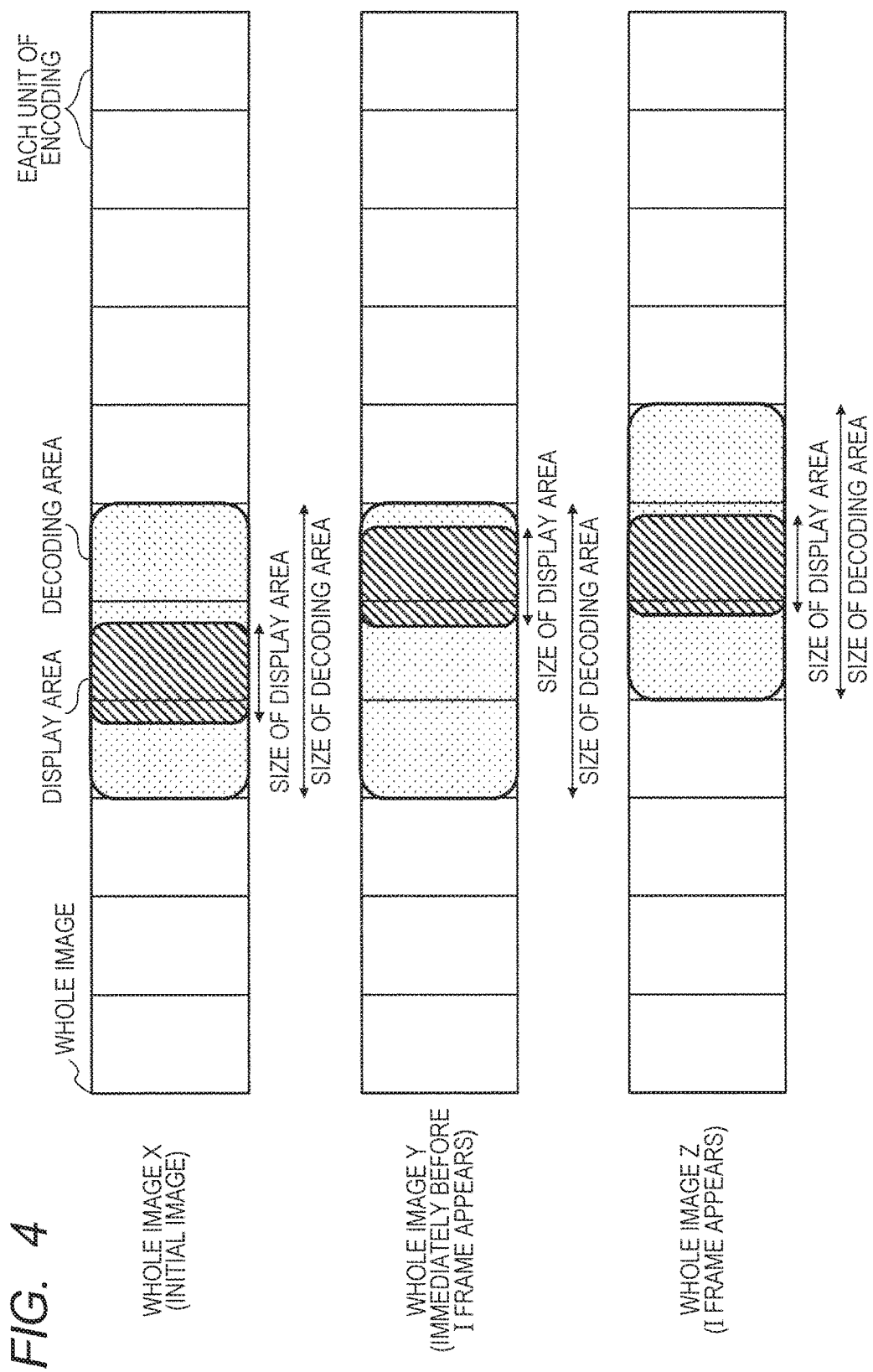
FIG. 4 is a diagram showing an overview of an operation example of the encoding side device 10 and the reproduction side device 20 according to the first embodiment.

As shown in FIG. 4, the small screen dividing unit 102 of the encoding side device 10 forms a moving image. The small screen dividing unit 102 divides each of a plurality of temporally continuous images (whole images) into a plurality of small screen images, and the encoding unit 103 of the encoding side device 10 encodes each of the plurality of small screen images.

Figure 5:
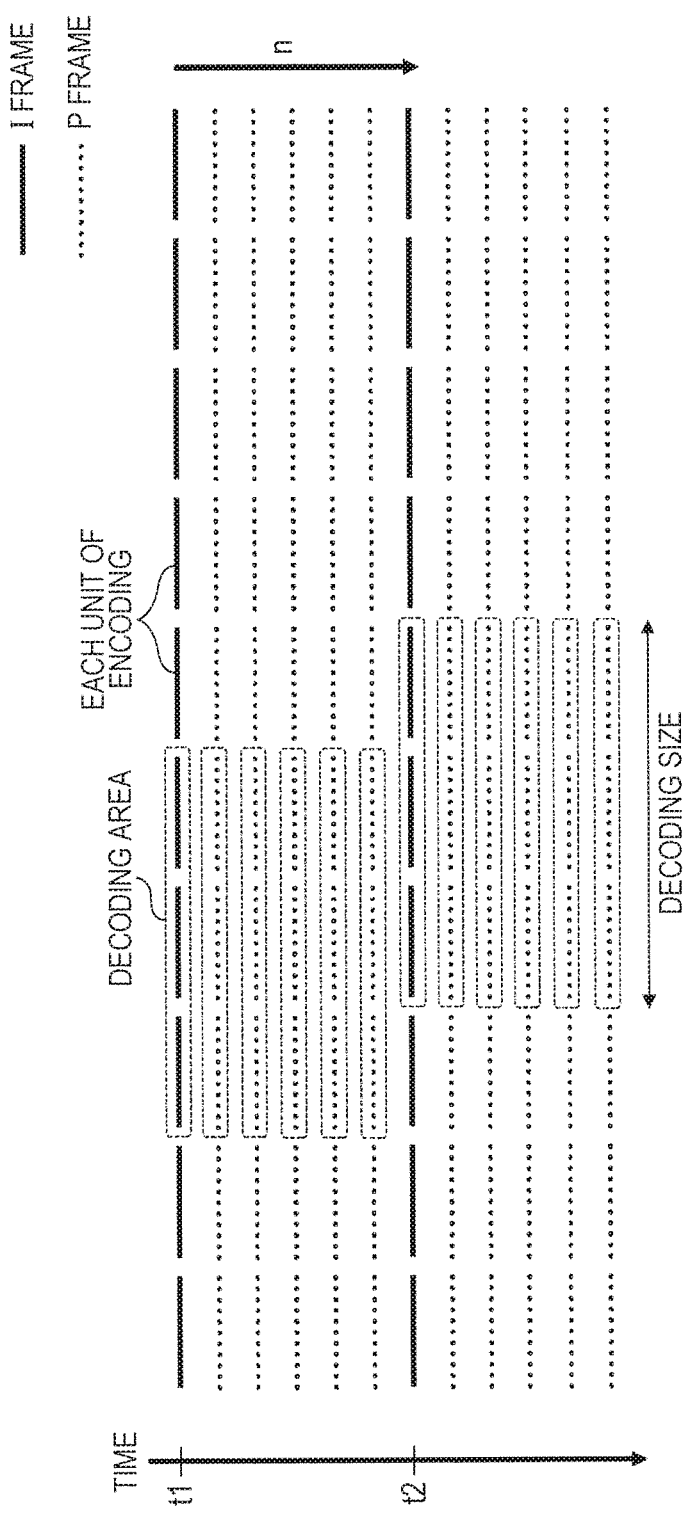
FIG. 5 is a diagram showing an overview of an operation example of the encoding side device 10 and the reproduction side device 20 according to the first embodiment.

As shown in FIG. 5, the encoding unit 103 of the encoding side device 10 encodes a small screen image as an I frame at constant time intervals. In the example of FIG. 5, the encoding unit 103 of the encoding side device 10 defines a time interval of the I frame as n, and encodes all the small screen images as I frames at times t1 and t2. In the example of FIG. 5, the encoding unit 103 of the encoding side device 10 encodes the small screen images, which are not defined as I frames, as P frames. However, the encoding unit 103 may encode the small screen images as B frames (the same applies hereafter).

On the other hand, as shown in FIG. 4, the decoding area determination unit 203 of the reproduction side device 20 determines an area where margins are added to the display area (in the example of FIG. 4, margins are added to the left and right of the display area) as a decoding area, and the decoding unit 204 of the reproduction side device 20 decodes an image in the decoding area determined by the decoding area determination unit 203.

Here, the decoding area determination unit 203 of the reproduction side device 20 determines a new decoding area based on the current display area at a timing when an image of I frame appears in the decoding area. In the example of FIG. 5, the time when the image of I frame appears in the decoding area is t1 and t2, so that the decoding area determination unit 203 determines a new decoding area at times t1 and t2.

In the example of FIG. 4, the upper diagram shows an initial whole image X, the lower diagram shows a whole image Z when an image of I frame appears thereafter in the decoding area, and the middle diagram shows a whole image Y immediately before the whole image Z. Therefore, after the initial whole image X, at the timing of the whole image Z when an image of I frame appears in the decoding area, the reproduction side device 20 determines an area where margins are added to the left and right of the current display area as a new decoding area. Here, the current display area has moved right with respect to the initial whole image X, so that the newly determined decoding area has also moved right according to moving of the display area.

In this way, the decoding area determination unit 203 of the reproduction side device 20 determines a new decoding area based on the current display area at a timing when an image of I frame appears in the decoding area. Here, it is possible to quickly decode the I frame. Before a new decoding area is determined, the small screen image is a P frame, and the P frame can be decoded in advance by referring to an I frame in a decoding area that is most recently determined and a P frame following the I frame. Therefore, by decoding the small screen images in the decoding area in advance, even when the display area moves to an area of another unit of encoding in the decoding area, it is possible to quickly display the display area. Therefore, it is possible to smoothly move the display area.

In the above description, an example is described where a whole image is divided into small screen images only in the horizontal direction. However, the whole image may be divided in the vertical direction according to a relationship between the size of the whole image and the screen size of the display unit 206. When the whole image is divided in the vertical direction, the operation is the same as that when the whole image is divided only in the horizontal direction, and a new decoding area is an area where margins are added above and below the current display area.

<Flow of Operation Example of Reproduction Side Device 20 According to First Embodiment>

Subsequently, a flow of an operation example of the reproduction side device 20 according the first embodiment will be described with reference to FIG. 6. The operation of FIG. 6 is started at a time point when encoded data of each of a plurality of small screen images obtained by dividing a whole image is received by the data reception unit 201.

Figure 6:
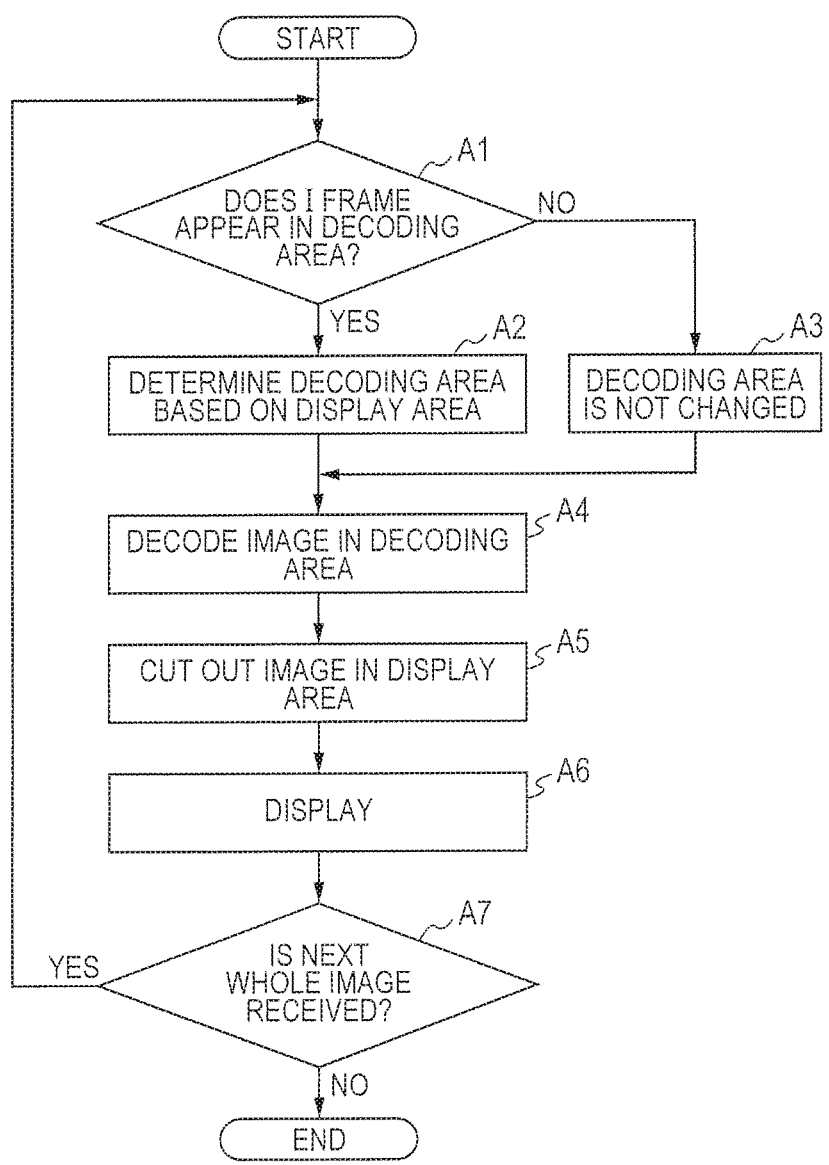
FIG. 6 is a flowchart showing a flow of an operation example of the reproduction side device 20 according to the first embodiment.

As shown in FIG. 6, the decoding area determination unit 203 determines whether or not an I frame appears in the decoding area of a whole image received by the data reception unit 201 (step A1), and if no I frame appears (no in step A1), the decoding area determination unit 203 determines not to change the decoding area (step A3).

On the other hand, if an I frame appears in the decoding area in step A1 (yes in step A1), the decoding area determination unit 203 determines a new decoding area based on a current display area (step A2).

Next, the decoding unit 204 decodes an image which is included in the whole image received by the data reception unit 201 and which is in the decoding area determined by the decoding area determination unit 203 (step A4). Next, the image cutting-out unit 205 cuts out an image in a display area inputted into the display area, input unit 202 from the image decoded by the decoding unit 204 (step A5). Next, the display unit 206 displays the image cut out by the image cutting-out unit 205 (step A6).

Next, the decoding area determination, unit 203 determines whether or not encoded data of next whole image is received by the data reception unit 201 (step A7). It the next whole image is received (yes in step A7), the decoding area determination unit 203 returns to processing of step A1. If the next whole image is not received (no in step A7), the decoding area determination unit 203 ends the processing.

(1-3) Effect of First Embodiment

As described above, according to the first embodiment, the encoding side device 10 divides the whole image that forms a moving image into a plurality of small screen images and encodes the small screen images, and the reproduction side device 20 determines a new decoding area based on the current display area at a timing when an I frame appears in the decoding area. Therefore, by decoding the small screen images in the decoding area in advance, even when the display area moves to another area in the decoding area, it is possible to quickly display an image in the display area after the movement. Therefore, it is possible to smoothly move the display area.

(1-4) Modified Example of First Embodiment

In the first embodiment, the encoding side device 10 transmits the encoded data of all the areas of the whole image. However, the encoding side device 10 may transmit only the encoded data of the decoding areas to be decoded by the reproduction side device 20 in order to perform band suppression of transmission path between the encoding side device 10 and the reproduction side device 20. In this case, for example, the encoding side device 10 may have a configuration shown in FIG. 7 and the reproduction side device 20 may have a configuration shown in FIG. 8.

Figure 8:
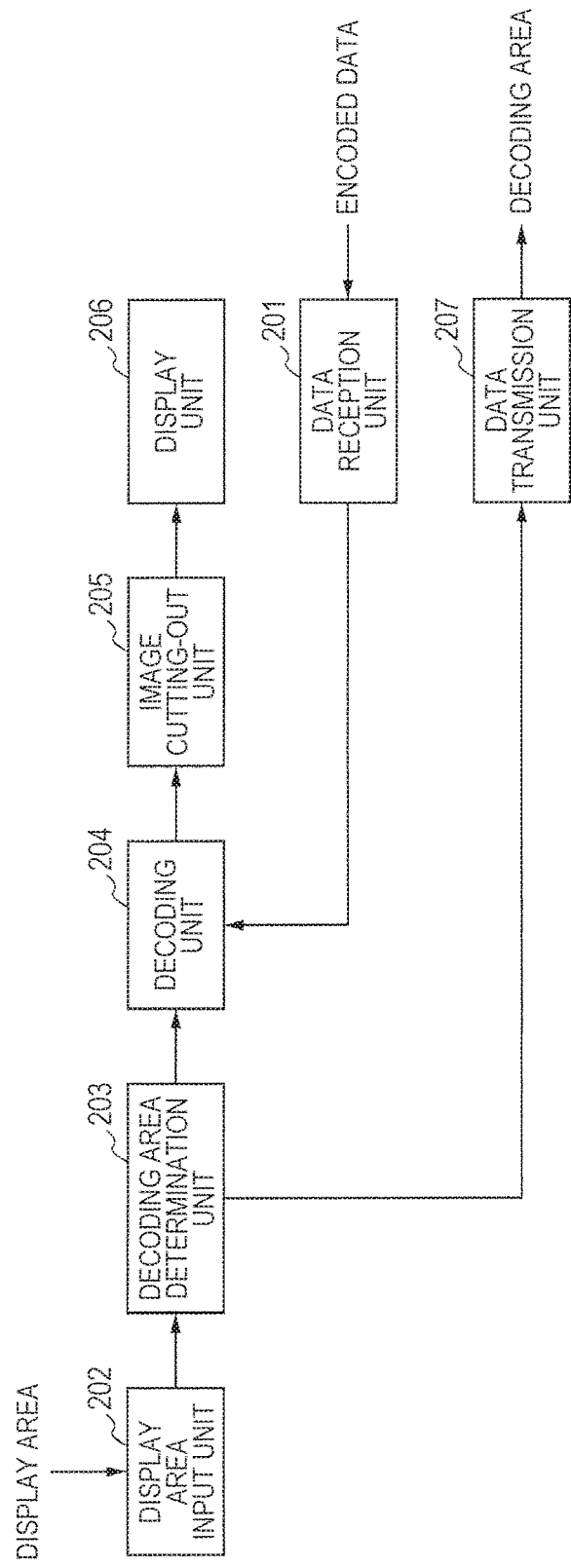
FIG. 8 is a block diagram showing a configuration of a reproduction side device 20 according to the modified example of the first embodiment.

As shown in FIG. 8, the reproduction side device 20 according to the modified example of the first embodiment is different from the reproduction side device 20 shown in FIG. 3 in that a data transmission unit 207 is added. The data transmission unit 207 transmits information of decoding area determined by the decoding area determination unit 203 to the encoding side device 10.

Figure 7:
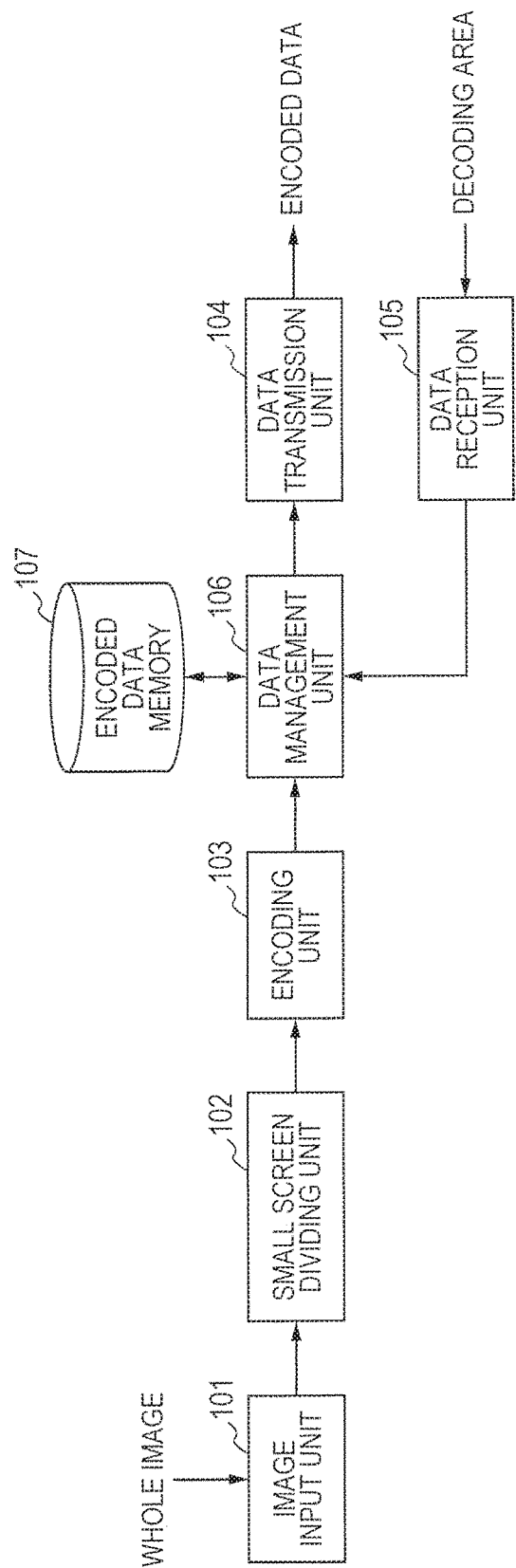
FIG. 7 is a block diagram showing a configuration of an encoding side device 10 according to a modified example of the first embodiment.

As shown in FIG. 7, the encoding side device 10 according to the modified example of the first embodiment is different from the encoding side device 10 shown in FIG. 2 in that a data reception unit 105, a data management unit 106, and an encoded data memory 107 are added. The data reception unit 105 receives the information of decoding area from the reproduction side device 20. The data management unit 106 temporarily stores encoded data of all the areas of the whole image (that is divided into a plurality of small screen images) encoded by the encoding unit 103 into the encoded data memory 107. Then, the data management unit 106 extracts only the encoded data of the decoding area from the encoded data of all the areas of the whole image stored in the encoded data memory 107 based on the information of decoding area received from the reproduction side device 20 and outputs the extracted encoded data of the decoding area to the data transmission unit 104. The data transmission unit 104 transmits only the encoded data of the decoding area outputted from the data management unit 106 to the reproduction side device 20.

Thereby, only the encoded data of the decoding area is transmitted from the encoding side device 10 to the reproduction side device 20, so that it is possible to suppress a band of the transmission path between the encoding side device 10 and the reproduction side device 20.

(2) Second Embodiment

In the first embodiment described above, one reproduction side device 20 is provided for one encoding side device 10.

On the other hand, in the second embodiment, a plurality reproduction side devices 20 are provided for one encoding side device 10, and each of the reproduction side devices 20 individually displays a moving image based on one encoded data generated by the encoding side device 10.

(2-1) Configuration of Second Embodiment

<Configuration of Moving Image Processing System According to Second Embodiment>

Figure 9:
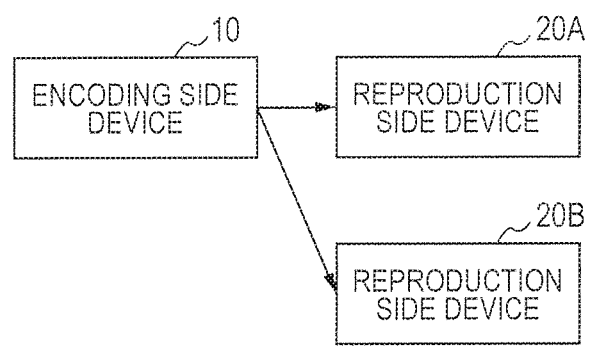
FIG. 9 is a diagram showing a configuration example of a moving image processing system according to a second embodiment.

Hereinafter, a configuration of the second embodiment will be described. First, a configuration example of a moving image processing system according to the second embodiment will be described with reference to FIG. 9. As shown in FIG. 9, the moving image processing system according to the second embodiment is different from that shown in FIG. 1 in that two reproduction side devices 20A and 20B (hereinafter appropriately referred to as a "reproduction side device 20" when a specific reproduction side device is not specified) are included. Here, for ease of description, the number of the reproduction side devices 20 is two. However, the number is not limited to two, and the number of the reproduction side devices 20 may be two or more.

Each of the reproduction side devices 20A and 20B individually displays a moving image based on one encoded data generated in the encoding side device 10.

At this time, display areas that are specified respectively for the reproduction side devices 20A and 20B by a user may be different from each other. Therefore, each of the reproduction side devices 20A and 20B individually determines a decoding area, performs decoding, and performs cutting-out and displaying of an image.

Further, processing performances and movement amounts (moving speeds) of the current display area of the reproduction side devices 20A and 20B may be different from each other. Here, the movement amount (moving speed) of the current display area is the amount of movement where the current display area has moved from the previous display area. Therefore, the reproduction side devices 20A and 20B switch the size of the decoding area (that is, the sizes of margins added to the display area) based on the movement amount of the current display area. However, it is not limited thereto, and the reproduction side devices 20A and 20B may switch the size of the decoding area based on a moving speed of an object (for example, a ball, a vehicle, and the like) in a moving image, a band of the transmission path between the reproduction side device 20 and the encoding side device 10, and the like. It is assumed that the reproduction side devices 20A and 20B acquire the moving speed of the object from the encoding side device 10, derive the movement amount of the current display area from the display area inputted by a user through an input device (not shown in the drawings) such as a touch panel and a keyboard, and know in advance the performances of their own and the band of the transmission path.

An internal configuration of the encoding side device 10 may be the same as that shown in FIG. 2 or 7, so that its diagram and description will be omitted. Although the reproduction side devices 20A and 20B may have processing performances different from each other as described above, the reproduction side devices 20A and 20B may have the same internal configuration as that shown in FIG. 3 or 8. Therefore, the diagram and description of the internal configuration of the reproduction side devices 20A and 20B will be omitted.

(2-2) Operation of Second Embodiment

Hereinafter, an operation of the second embodiment will be described. An operation of the encoding side device 10 is the same as that of the first embodiment, so that hereinafter only an operation of the reproduction side devices 20A and 20B will be described. Further, in the description below, it is assumed that each of the reproduction side devices 20A and 20B individually switches the size of the decoding area based on the movement amount of the current display area.

<Overview of Operation Example of Reproduction Side Devices 20A and 20B According to Second Embodiment>

First, an overview of an operation example of the reproduction side devices 20a and 20b according to the second embodiment will be described with reference to FIGS. 10 and 11.

Figure 10:
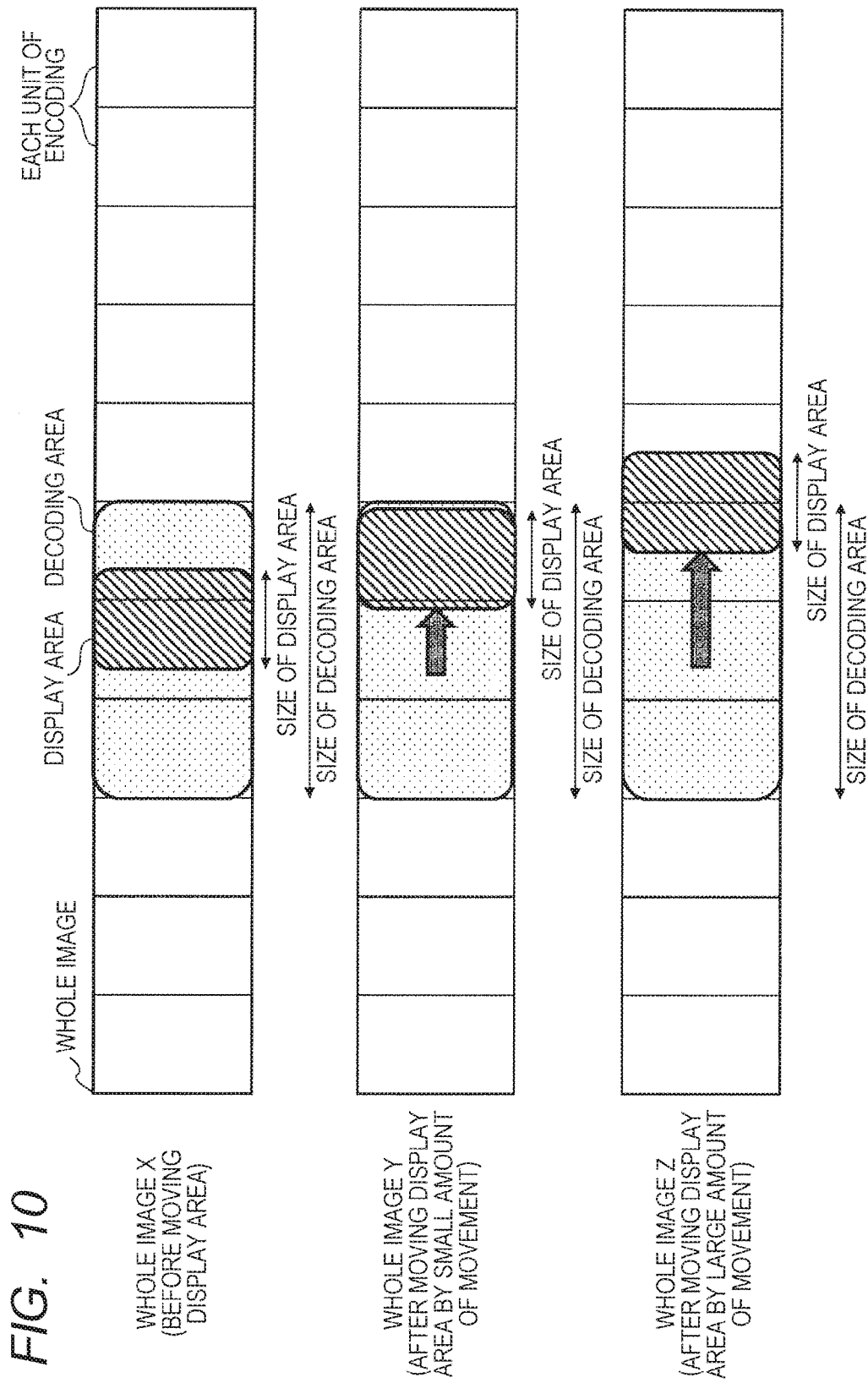
FIG. 10 is a diagram showing an overview of an operation example of an encoding side device 10 and reproduction side devices 20A and 20B according to the second embodiment.
Figure 11:
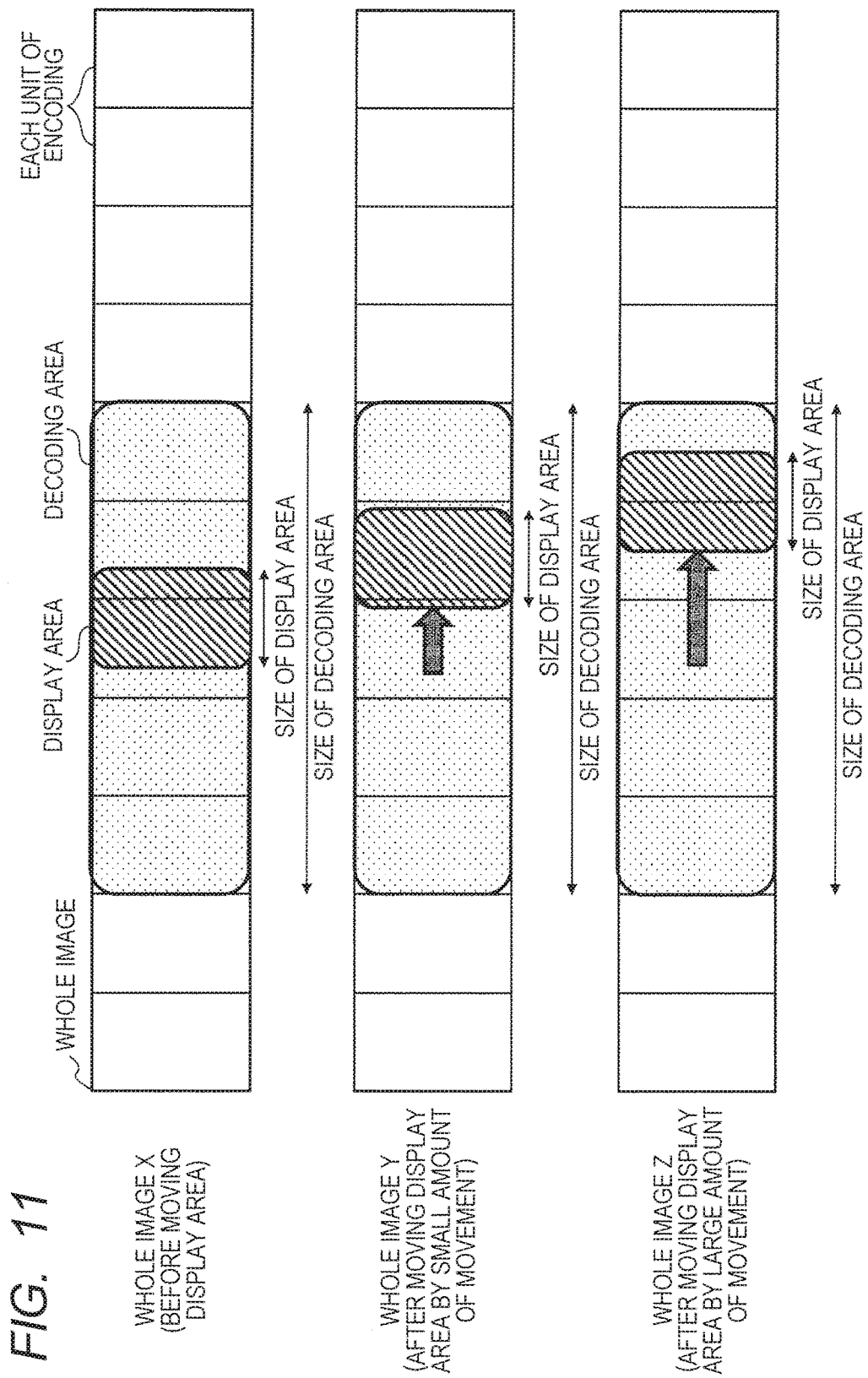
FIG. 11 is a diagram showing an overview of an operation example of the encoding side device 10 and the reproduction side devices 20A and 20B according to the second embodiment.

In the examples of FIGS. 10 and 11, the upper diagram shows a whole image X immediately before the display area moves, the middle diagram shows a whole image Y after the display area has moved by a small movement amount from the display area of the whole image X, and the lower diagram shows a whole image Z after the display area has moved by a large movement amount from the display area of the whole image X. FIG. 10 is an example of a case where the size of the decoding area is small, and FIG. 11 is an example of a case where the size of the decoding area is large.

In the example of FIG. 10, the size of the decoding area is small. In the whole image Y where the display area of the whole image X has moved by a small movement amount, the entire display area after the movement is included in the decoding area, so that the image in the display area after the movement can be decoded and displayed. However, in the whole image Z where the display area of the whole image X has moved by a large movement amount, a part of the display area after the movement protrudes from the decoding area. The image in the protruded display area cannot be decoded, so that the image is displayed as a black image or the like.

On the other hand, in the example of FIG. 11, the size of the decoding area is large. Therefore, even in the whole image Z where the display area of the whole image X has moved by a large movement amount, the entire display area after the movement is included in the decoding area, so that the image in the display area after the movement can be decoded and displayed. Therefore, it is possible to smoothly move the display area.

Therefore, when the movement amount of the current display area is large, the decoding area determination unit 203 of the reproduction side devices 20A and 20B increases the size of the decoding area. Thereby, even when the display area thereafter has moved by a large movement amount, it is possible to display the image in the display area after the movement.

<Flow of Operation Example of Reproduction Side Devices 20A and 20B According to Second Embodiment>

Figure 12:
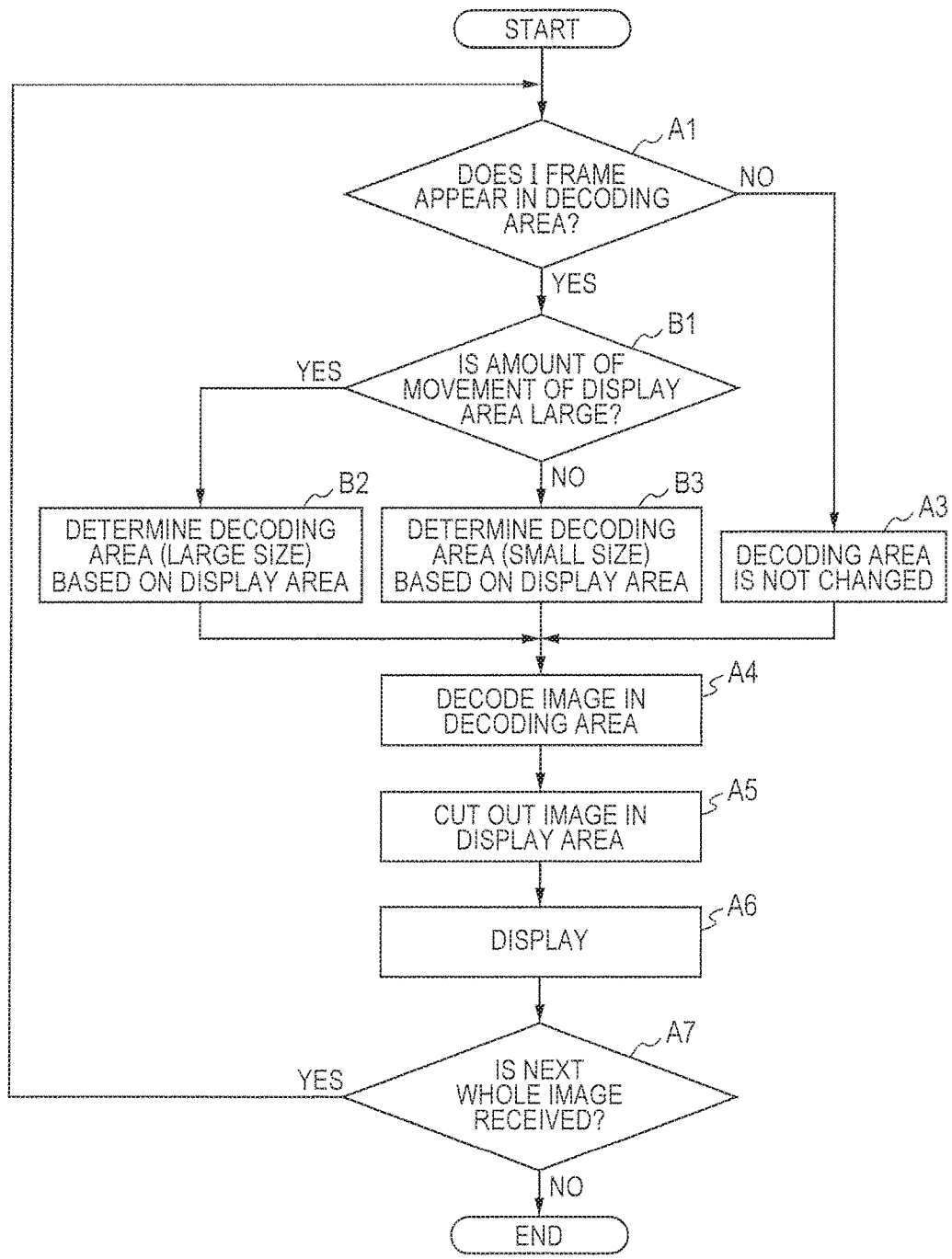
FIG. 12 is a flowchart showing a flow of an operation example of the reproduction side devices 20A and 20B according to the second embodiment.

Subsequently, a flow of an operation example of the reproduction side devices 20A and 205 according to the second embodiment will be described with reference to FIG. 12. FIG. 12 is different from FIG. 6 in that steps B1 to B3 are included instead of step A2.

As shown in FIG. 12, first, the same processing of step A1 as that in FIG. 6 is performed, and if no I frame appears in the decoding area of the whole image (no in step A1), the same processing of step A3 as that in FIG. 6 is performed.

On the other hand, if the I frame appears in the decoding area of the whole image (yes in step A1), the decoding area determination unit 203 determines whether or not the movement amount of the current display area is large (step B1). Regarding a method of determining whether or not the movement amount is large, for example, a method is considered where a threshold value is set and it is determined that the movement amount is large when the movement amount exceeds the threshold value. However, it is not limited thereto.

In step B1, if the movement amount of the current display area is large (yes in step B1), the decoding area determination unit 203 newly determines a large size decoding area based on the current display area (step B2). Specifically, the decoding area determination unit 203 increases the size of the decoding area by enlarging the margins added to the left and right sides of the current display area to be larger than usual. Thereafter, the decoding area determination unit 203 proceeds to processing of step A4.

On the other hand, in step B1, if the movement amount of the current display area is not large (no in step B1), the decoding area determination unit 203 newly determines a small size decoding area based on the current display area (step B3). Specifically, the decoding area determination unit 203 decreases the size of the decoding area by setting the sizes of the margins added to the left and right sides of the current display area to normal small sizes. Thereafter, the decoding area determination unit 203 proceeds to processing of step A4.

Thereafter, the same processing of steps A4 to A7 as that in FIG. 6 is performed.

(2-3) Effect of Second Embodiment

As described above, according to the second embodiment, the reproduction side devices 20A and 20B switch the size of the decoding area based on the movement amount of the current display area. For example, when the movement amount of the current display area is large, the decoding area determination unit 203 of the reproduction side devices 20A and 20B increases the size of the decoding area. Thereby, even when the display area thereafter moves by a large movement amount, it is possible to display an image in the display area after the movement In the above description, an operation is described in which the reproduction side devices 20A and 20B switch the size of the decoding area based on the movement amount of the current display area. However, as described above, the reproduction side devices 20A and 20B can switch the size of the decoding area based on the processing performance of the reproduction side device 20, a moving speed of an object in a moving image, a band of the transmission path between the reproduction side device 20 and the encoding side device 10, and the like. For example, when using the processing performance of the reproduction side device 20, if the processing performance is high, it is preferable to increase the size of the decoding area. When using the moving speed of an object in a moving image, if the moving speed is high, it is preferable to increase the size of the decoding area. When using the band of the transmission path, if the band is wide, it is preferable to increase the size of the decoding area.

(3) Third Embodiment

In the first and the second embodiments described above, the reproduction side device 2, determines a new decoding area based on the current display area.

On the other hand, in a third embodiment, the reproduction side device 20 determines a new decoding area based on not only the current display area but also a previous display area, a history of the display area, and a motion of an object and a position of a point to be noted in a moving image, and the like.

(3-1) Configuration of Third Embodiment

Hereinafter, configuration examples 1 to 4 of the third embodiment will be described.

CONFIGURATION EXAMPLE 1 OF THIRD EMBODIMENT

The configuration example 1 predicts the next and following display areas based on a moving direction of the current display area and determines a new decoding area based on the predicted next and following display areas. The moving direction of the current display area indicates a direction in which the current display area has moved from the previous display area.

A configuration of the moving image processing system according to the configuration example 1 may be the same as the configuration shown in FIG. 1 or 9, so that its diagram and description will be omitted. Further, a configuration of the encoding side device 10 according to the configuration example 1 may be the same as the configuration shown in FIG. 2 or 7, so that its diagram and description will be omitted.

Figure 13:
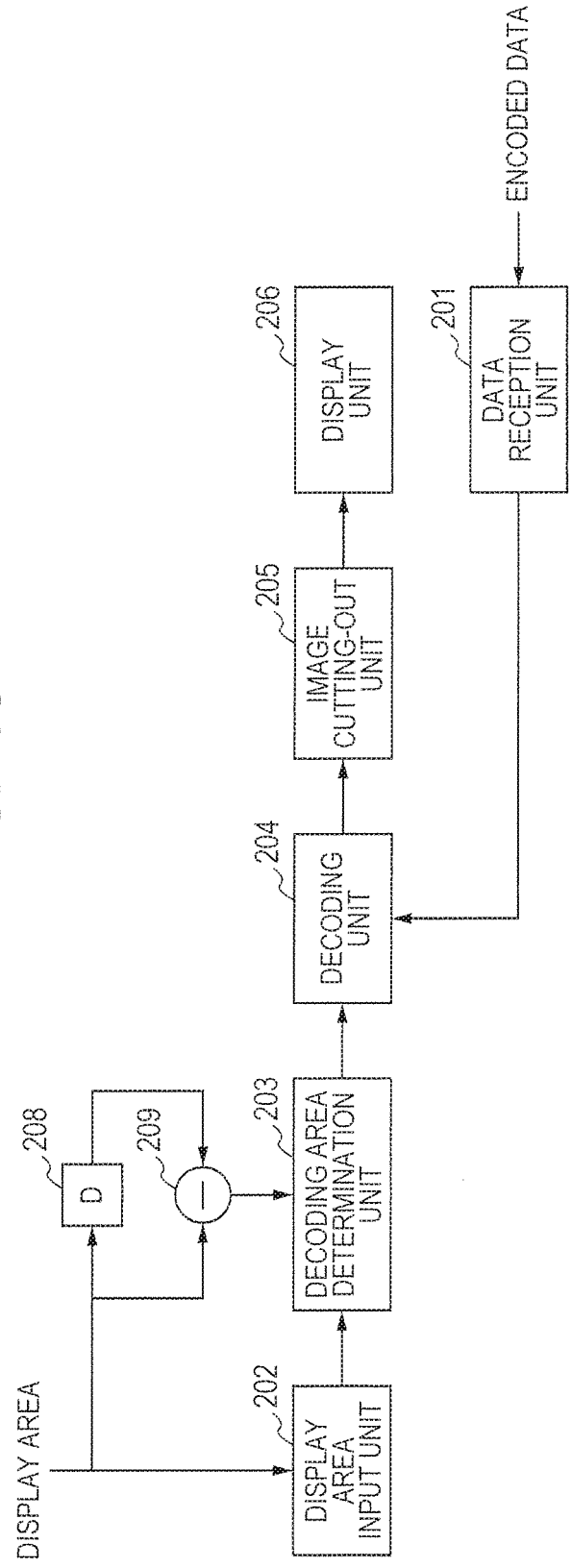
FIG. 13 is a block diagram showing a configuration of a reproduction side device 20 according to a configuration example 1 of a third embodiment.

Therefore, a configuration of the reproduction side device 20 according to the configuration example 1 will be described with referent to FIG. 13. As shown in FIG. 13, the reproduction side device 20 according to the configuration example 1 is different from the reproduction side device 20 shown in FIG. 3 in that a delay unit 208 and a subtracter 209 are added. The reproduction side device 20 according to the configuration example 1 may have a configuration in which the same delay unit 208 and subtracter 209 are added to FIG. 8.

The delay unit 208 delays the current display area inputted by a user through an input device (not shown in the drawings) by one frame. The subtracter 209 derives a difference between the current display area and a previous display area that is delayed by the delay unit 208 and outputs information of the derived difference to the decoding area determination unit 203.

The decoding area determination unit 203 predicts the next and following display areas based on the information of the difference outputted from the subtracter 209 and determines a new decoding area based on the predicted next and following display areas. For example, when the current display area has moved rightward from the previous display area, the decoding area determination unit 203 predicts that the next and following display areas move rightward. In this case, the decoding area determination unit 203 determines an area, where the right margin of the margins added to the left and right sides of the current display area is set larger than the left margin, as a new decoding area.

CONFIGURATION EXAMPLE 2 OF THIRD EMBODIMENT

The configuration example 2 predicts the next and following display areas based on the history of the display area and determines a new decoding area based on the predicted next and following display areas.

A configuration of the moving image processing system according to the configuration example 2 may be the same as the configuration shown FIG. 1 or 9, so that its diagram and description will be omitted. Further, a configuration of the encoding side device 10 according to the configuration example 2 may be the same as the configuration shown in FIG. 2 or 7, so that its diagram and description will be omitted.

Figure 14:
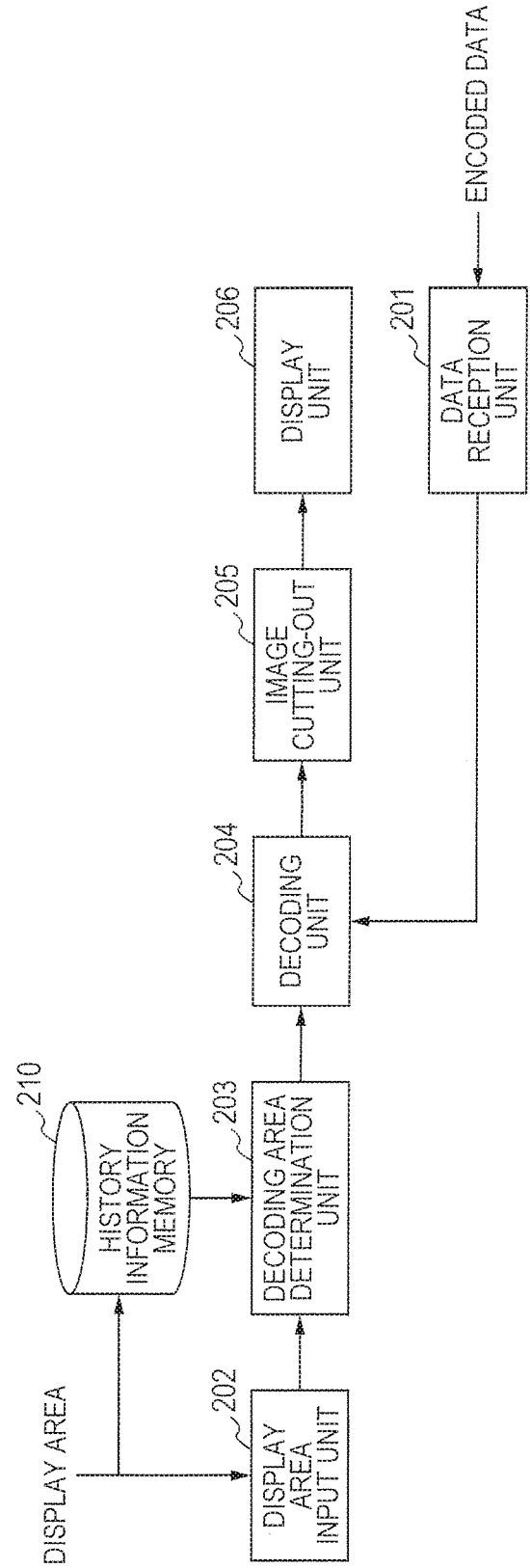
FIG. 14 is a block diagram showing a configuration of a reproduction side device 20 according to a configuration example 2 of the third embodiment.

Therefore, a configuration example of the reproduction side device 20 according to the configuration example 2 will be described with reference to FIG. 14. As shown in FIG. 14, the reproduction side device 20 according to the configuration example 2 is different from the reproduction side device 20 shown in FIG. 3 in that a history information memory 210 is added. The reproduction side device 20 according to the configuration example 2 may have a configuration in which the same history information memory 210 is added to FIG. 8.

The history information memory 210 stores history information representing a history of display areas inputted by a user through an input device (not shown in the drawings). The decoding area determination unit 203 predicts the next and following display areas based on the history information of display areas including the current display area, which is stored in the history information memory 210, and determines a new decoding area based on the predicted next and following display areas. For example, when it is determined that the next moving direction of the current display area tends to be rightward from the history of display areas, the decoding area determination unit 203 predicts that the next and following display areas move rightward in this case, the decoding area determination unit 203 determines an area, where the right margin of the margins added to the left and right sides of the current display area is set larger than the left margin, as a new decoding area.

CONFIGURATION EXAMPLE 3 OF THIRD EMBODIMENT

The configuration example 3 predicts the next and following display areas based on accumulated history information of display areas used by another user and determines a new decoding area based on the predicted next and following display areas.

Figure 15:
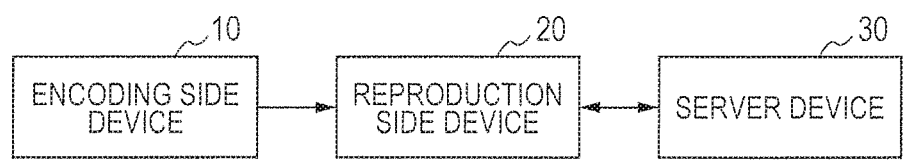
FIG. 15 is a diagram showing a configuration of a moving image processing system according to a configuration example 3 of the third embodiment.

First, a configuration example of the moving image processing system according to the configuration example 3 will be described with reference to FIG. 15. The moving image processing system according to the configuration example 3 is different from the moving image processing system shown in FIG. 1 in that a server device 30 is added.

Figure 16:
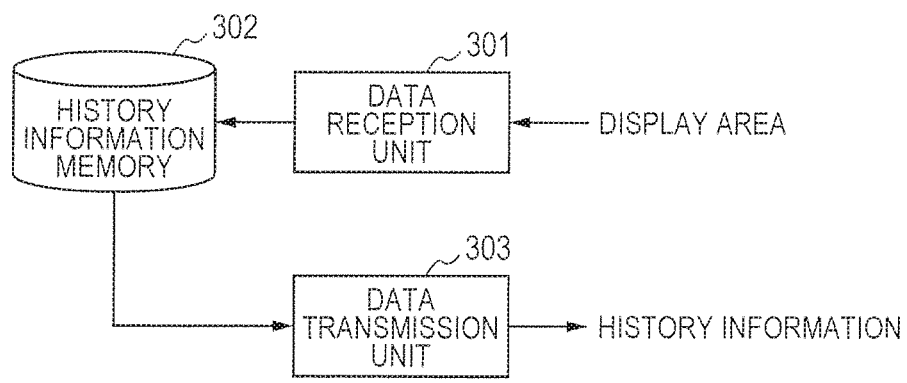
FIG. 16 is a block diagram showing a configuration of a server device 30 according to the configuration example 3 of the third embodiment.

Next, a configuration example of the server device 30 according to the configuration example 3 will be described with reference to FIG. 16. As shown in FIG. 16, the server device 30 according to the configuration example 3 includes a data reception unit 301, a history information memory 302, and a data transmission unit 303.

The data reception unit 301 receives information of the display area of the reproduction side device 20 from the reproduction side device 20. The history information memory 302 adds history information representing a history of display areas of the reproduction side device 20 to history information of display areas used by another user, which has already been accumulated. The data transmission unit 303 transmits the history information of display areas used by the other user, which has already been accumulated, to the reproduction side device 20.

Figure 17:
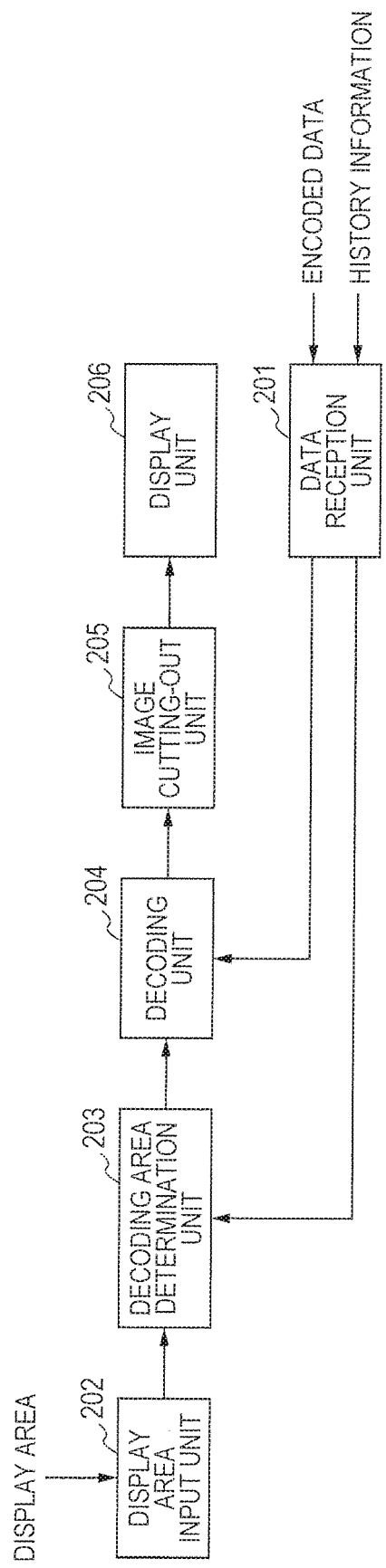
FIG. 17 is a block diagram showing a configuration of reproduction side devices 20A and 20B according to the configuration example 3 of the third embodiment.

Next, a configuration example of the reproduction side device 20 according to the configuration example 3 will be described with reference to FIG. 17. As shown in FIG. 17, the reproduction side device 20 according to the configuration example 3 has the same components as those shown in FIG. 3, however, performs an operation different from that shown in FIG. 3.

Specifically, the data reception unit 201 receives encoded data from the encoding side device 10 and receives the history information of display areas used by the other user from the server device 30. The decoding area determination unit 203 predicts the next and following display areas based on the history information of display areas used by the other user and determines a new decoding area based on the predicted next and following display areas. For example, when it is determined that the next moving direction of the current display area tends to be rightward from the history of display areas used by the other user, the decoding area determination unit 203 predicts that the next and following display areas move rightward. In this case, the decoding area determination unit 203 determines an area, where the right margin of the margins added to the left and right sides of the current display area is set larger than the left margin, as a new decoding area.

The reproduction side device 20 according to the configuration example 3 may have the same components as those shown in FIG. 8 and perform the same operation as described above. An internal configuration of the encoding side device 10 according to the configuration example 3 may be the same as that shown in FIG. 2 or 7, so that its diagram and description will be omitted.

Configuration Example 4 of Third Embodiment

The configuration example 4 determines a new decoding area based on a motion of an object and a position of a point to be noted in a moving image. Here, the point to be noted is a position on which a user focuses attention. For example, when performances are separately given at two positions away from each other in a 360-degree moving image, the point to be noted is a position where a performance on which the user focuses attention is given. It is assumed that the point to be noted is specified by the user and is inputted into the display area input unit 202 or another input unit (not shown in the drawings) through an input device such as a touch panel and a keyboard (not shown in the drawings). On the other hand, the object is an object (for example, a ball, a vehicle, and the like) whose motion is large in the moving image.

A configuration of the moving image processing system according to the configuration example 4 may be the same as the configuration shown in FIG. 1 or 9, so that its diagram and description will be omitted.

Figure 18:
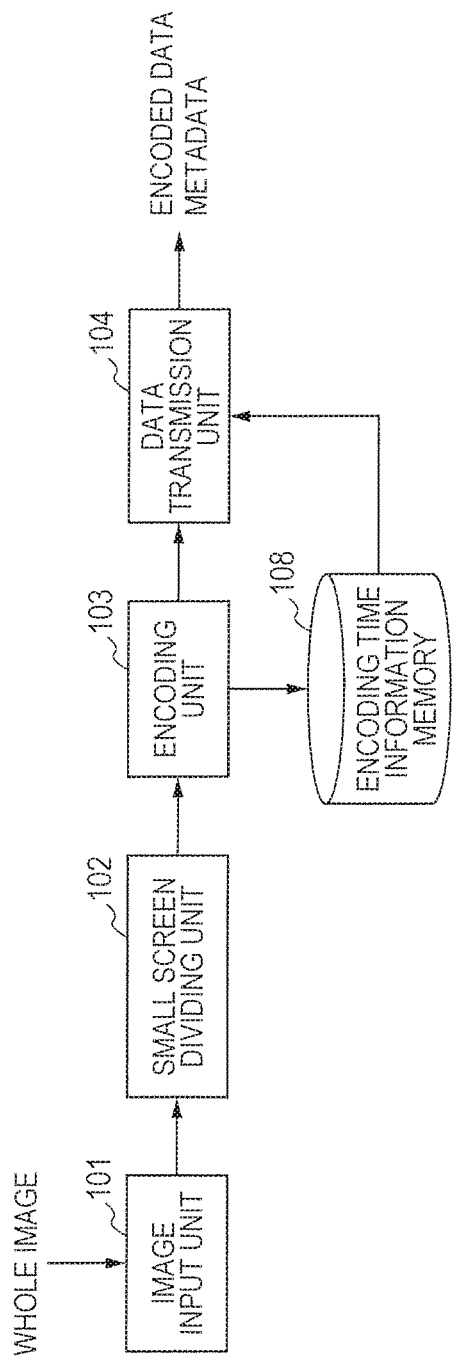
FIG. 18 is a block diagram showing a configuration of an encoding side device 10 according to a configuration example 4 of the third embodiment.

Therefore, first, a configuration example of the encoding side device 10 according to the configuration example 4 will be described with reference to FIG. 18. As shown in FIG. 18, the encoding side device 10 according to the configuration example 4 is different from the encoding side device 10 shown in FIG. 2 in that an encoding time information memory 108 is added. The encoding side device 10 according to the configuration example 4 may have a configuration in which the same encoding time information memory 108 is added to FIG. 7.

When the encoding unit 103 performs encoding, the encoding time information memory 108 stores encoding time information which is information (a motion of an object, a position of a point to be noted, and the like) in the encoded data obtained by image recognition or the like. The data transmission unit 104 transmits the encoded data to the reproduction side device 20 and further transmits the encoding time information stored in the encoding time information memory 108 to the reproduction side device 20 as metadata.

Figure 19:
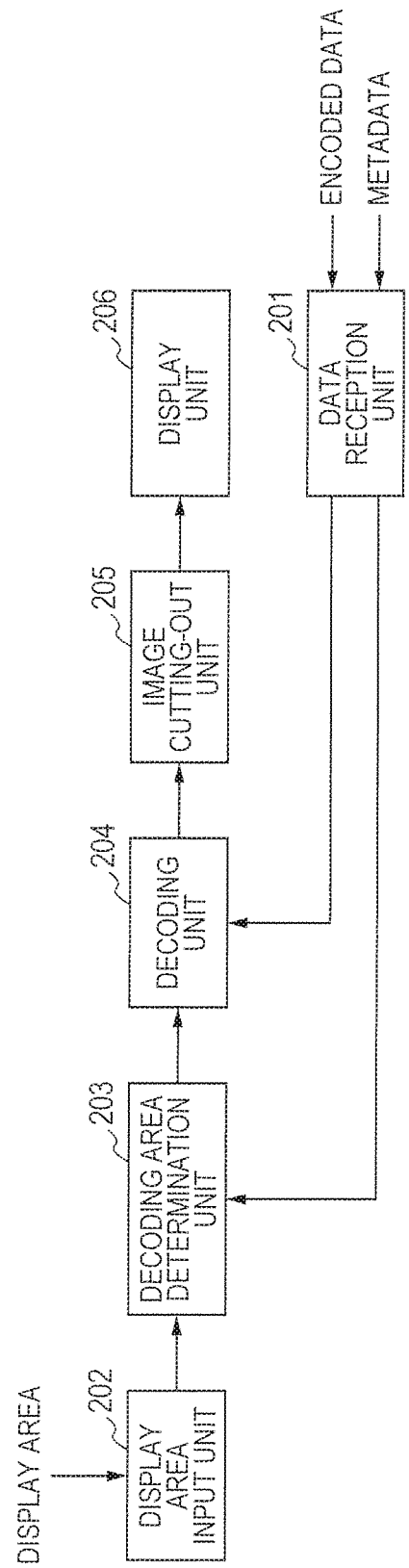
FIG. 19 is a block diagram showing a configuration of a reproduction side device 20 according to the configuration example 4 of the third embodiment.

Next, a configuration example of the reproduction side device 20 according to the configuration example 4 will be described with reference to FIG. 19. As shown in FIG. 19, the reproduction side device 20 according to the configuration example 4 has the same components as those shown in FIG. 3, however, performs an operation different from that shown FIG. 3.

Specifically, the data reception unit 201 receives the encoded data and the metadata from the encoding side device 10. The decoding area determination unit 203 determines anew decoding area based on the current display area and the metadata. When using metadata related to motion of an object, the decoding area determination unit 203 predicts the next and following display areas based on the current display area and a direction of the motion of the object and determines a new decoding area based on the predicted next and following display areas. For example, when the direction of the motion of the object is rightward, the decoding area determination unit 203 predicts that the next and following display areas move rightward. In this case, the decoding area determination unit 203 determines an area, where the right margin of the margins added to the left and right sides of the current display area is set larger than the left margin, as a new decoding area. When using metadata related to a point to be noted, the decoding area determination unit 203 not only determines an area, where margins are added to the left and right sides of the current display area, as the decoding area, but also determines a specific area including the point to be noted as the decoding area. Thereby, it is possible to move the display area to the point to be noted whenever a user wants.

The reproduction side device 20 according to the configuration example 4 may have the same components as those shown in FIG. 8 and perform the same operation as described above.

Another Configuration Example of Third Embodiment

The third embodiment may have a configuration other than the configuration examples 1 to 4 described above. For example, the decoding area determination unit 203 of the reproduction side device 20 may determine a new decoding area based on enlargement and reduction operations of a user. For example, when displaying an image whose size is enlarged to double the original size, the size of a necessary image before the enlargement becomes half, so that the size of the display area becomes half. On the other hand, when displaying an image whose size is reduced to half the original size, the size of a necessary image before the reduction becomes double, so that the size of the display area becomes double. In this manner, the size of the display area varies according to the enlargement and reduction operations of the user, so that the decoding area may be determined according to the varying size of the display area.

(3-2) Operation of Third Embodiment

Hereinafter, an operation of the third embodiment will be described. First, as an overview of an operation example of the third embodiment, operation examples of the configuration examples 1 and 4 will be described as a representative. An operation of the encoding side device 10 of the configuration examples 1 and 4 is the same as that of the first embodiment, so that hereinafter only an operation of the reproduction side device 20 will be described.
<Overview of Operation Example of Reproduction Side Device 20 According to Configuration Example 1 of Third Embodiment>

First, an overview of an operation example of the reproduction side device 20 according to the configuration example 1 of the third embodiment will be described with reference to FIG. 20.

Figure 20:
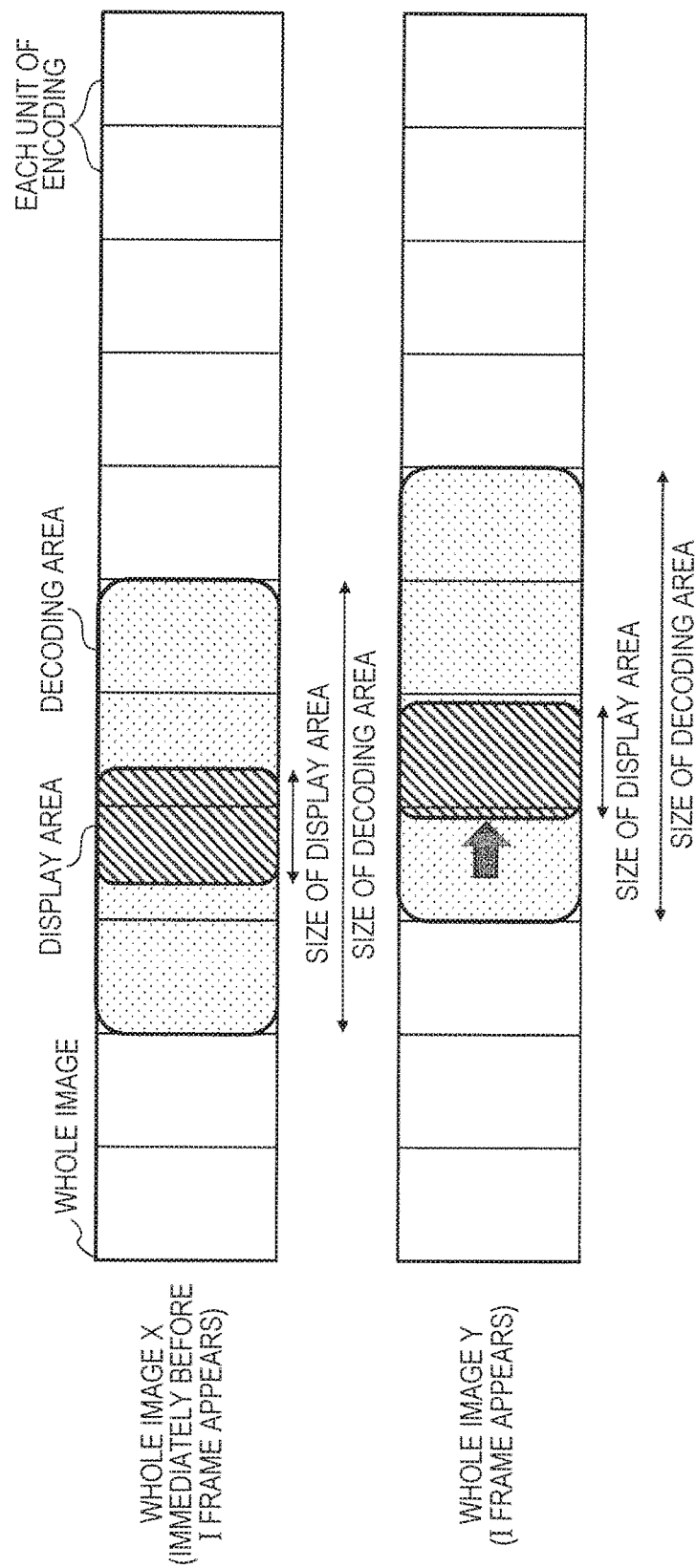
FIG. 20 is a diagram showing an overview of an operation example of an encoding side device 10 and the reproduction side device 20 according to the configuration example 1 of the third embodiment.

In the example of FIG. 20, the lower diagram shows a whole image Y when an image of I frame appears in the decoding area, and the upper diagram shows a whole image X immediately before the whole image Y. Here, the display area of the whole image Y when the image of I frame appears moves rightward from the display area of the whole image X immediately before the whole image Y. Therefore, the decoding area determination unit 203 of the reproduction side device 20 predicts that the display area moves rightward in the next and following whole images and determines an area, where the right margin of the margins added to the left and right sides of the current display area is set larger than the left margin, as a new decoding area.
<Overview of Operation Example of Reproduction Side Device 20 According to Configuration Example 4 of Third Embodiment>

Figure 21:
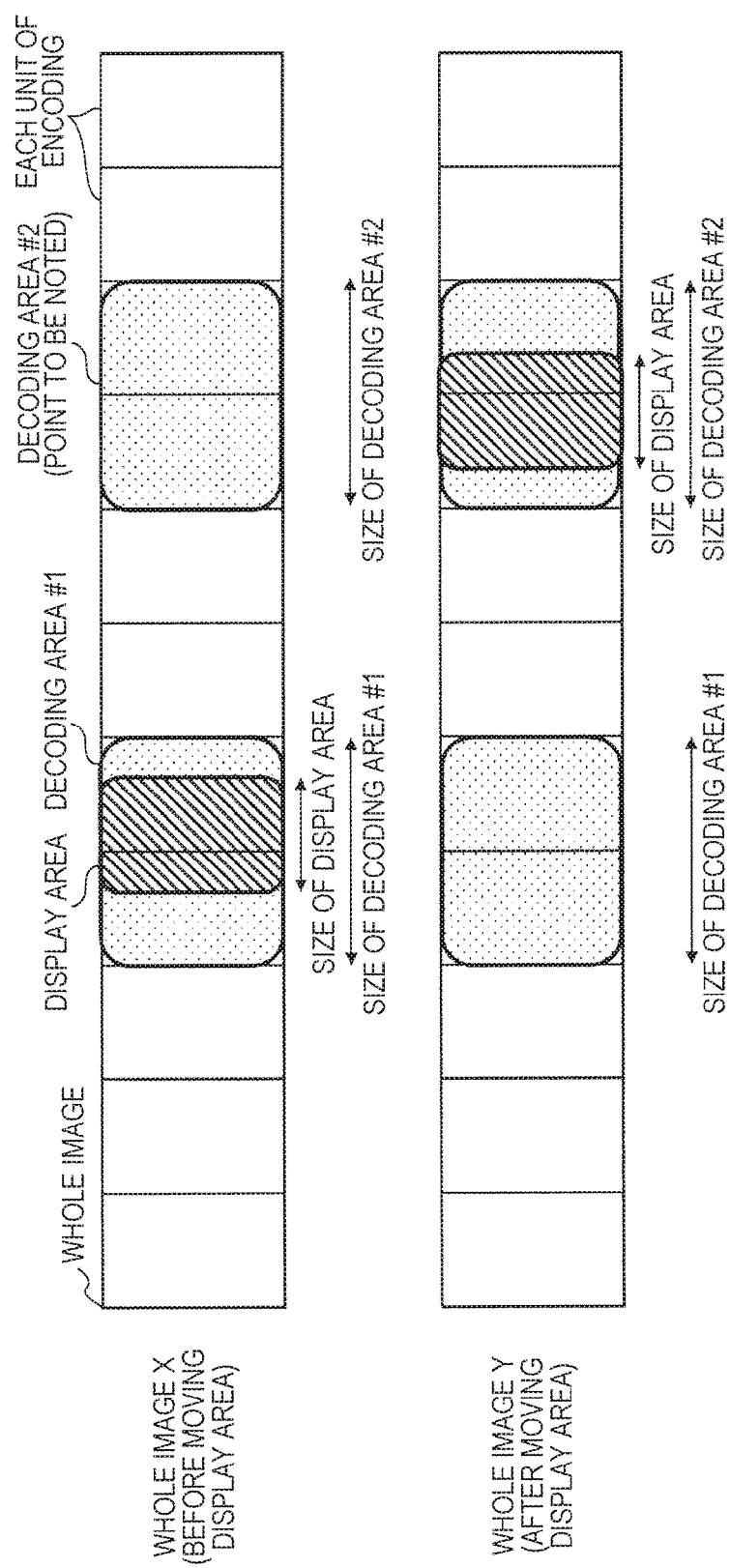
FIG. 21 is a diagram showing an overview of an operation example of the encoding side device 10 and the reproduction side device 20 according to the configuration example 4 of the third embodiment.

Next, an overview of an operation example of the reproduction side device 20 according to the configuration example 4 of the third embodiment will be described with reference to FIG. 21. FIG. 21 shows an operation example when using metadata related to a position of a point to be noted.

In the example of FIG. 21, the upper diagram shows a whole image X before the display area moves, and the lower diagram shows a whole image Y after the display area moves from the display area of the whole image X. Here, it is assumed that an image of I frame appears in the decoding area in the whole image X. Further, it is assumed that a point to be rioted is specified by a provider of moving image data. Therefore, the decoding area determination unit 203 of the reproduction side device 20 not only determines an area, where margins are added to the left and right sides of the current display area, as a decoding area #1, but also determines a specific area including the point to be noted as a decoding area #2 in the whole image X. As a result, the decoding unit 204 of the reproduction side device 20 decodes an image in the two decoding areas #1 and #2. Therefore, when using the whole image Y, if a user wants to move the display area to the point to be noted, it is possible to quickly display an image of the point to be noted. Thereby, it is possible to smoothly move the display area to the point to be noted whenever the user desires.

Subsequently, a flow of an operation example of the reproduction side device 20 according to the third embodiment will be described. In the description below, an operation example of the configuration example 4 will be described as a representative.
<Flow of Operation Example of Reproduction Side Device 20 According to Configuration Example 4 of Third Embodiment>

A flow of an operation example of the reproduction side device 20 according to the configuration example 4 of the third embodiment will be described with reference to FIG. 22.

Figure 22:
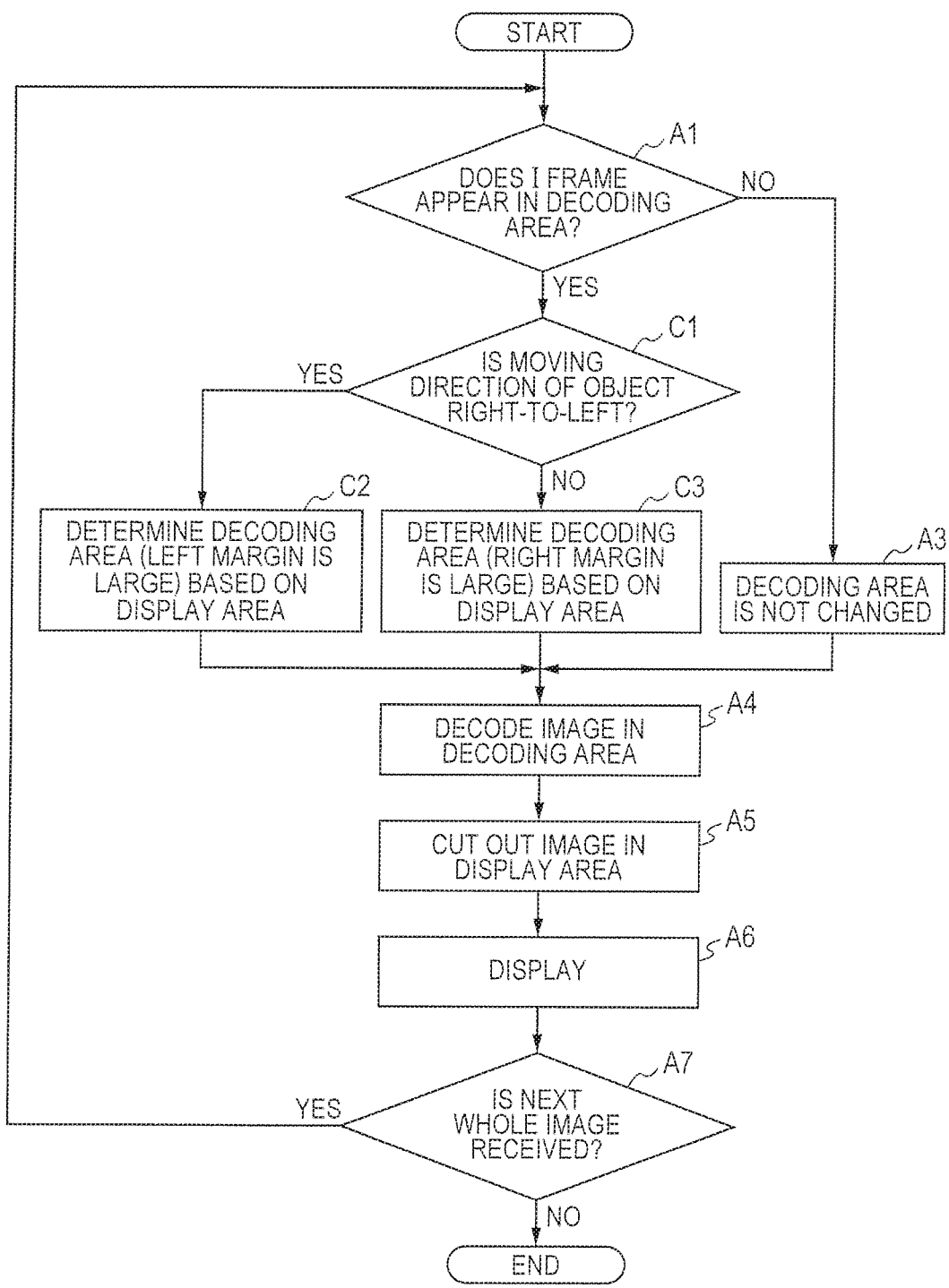
FIG. 22 is a flowchart showing a flow of an operation example of the reproduction side device 20 according to the configuration example 4 of the third embodiment.

FIG. 22 shows an operation example when using metadata related to motion of an object. FIG. 22 is different from FIG. 6 in that steps C1 to C3 are included instead of step A2.

As shown in FIG. 22, first, the same processing of step A1 as that in FIG. 6 is performed, and if no I frame appears in the decoding area of the whole image (no in step A1), the same processing of step A3 as that in FIG. 6 is performed.

On the other hand, if the I frame appears in the decoding area of the whole image (yes in step A1), the decoding area determination unit 203 determines whether or not the direction of the motion of the object in the moving image is leftward (step C1). Regarding a method of determining whether or not the direction of the motion of the object is leftward, for example, a method is considered which sets a threshold value and determines that the direction of the motion of the object is leftward when the leftward movement amount of the object exceeds the threshold value. However, it is not limited thereto.

In step C1, if the direction of the motion of the object is leftward (yes in step C1), the decoding area determination unit 203 determines an area, where the left margin of the margins added to the left and right sides of the current display area is set larger than the right margin, as a new decoding area (step C2). Thereafter, the decoding area determination unit 203 proceeds to processing of step A4.

On the other hand, if the direction of the motion of the object is not leftward (no in step C1), the decoding area determination unit 203 determines an area, where the right margin of the margins added to the left and right sides of the current display area is set larger than the left margin, as a new decoding area (step C3). Thereafter, the decoding area determination unit 203 proceeds to processing of step A4.

Thereafter, the same processing of steps A4 to A7 as that in FIG. 6 is performed.

(3-3) Effects of Third Embodiment

As described above, according to the third embodiment, the reproduction side device 20 determines a new decoding area based on not only the current display area but also the previous display area and the like. Therefore, it is possible to improve the accuracy of the decoding area. In particular, it is possible to improve the accuracy of the decoding area near a boundary when the decoding area is switched. The other effect is the same as that of the first embodiment.

(4) Fourth Embodiment

In the first to the third embodiments described above, the encoding side device 10 defines the time interval of I frame as n, and encodes all the small screen images as I frames at that time interval.

On the other hand, in the fourth embodiment, the encoding side device 10 can change the time interval at which the encoding side device 10 encodes a small screen image as an I frame.

(4-1) Configuration of Fourth Embodiment

A configuration of the fourth embodiment may be the same as that of any of the first to the third embodiments described above, so that its diagram and description will be omitted.

(4-2) Operation of Fourth Embodiment

Hereinafter, an operation of the fourth embodiment will be described. In the fourth embodiment, as described later, a timing when the I frame appears is irregular as compared with the first to the third embodiments described above. However, when the I frame appears, the reproduction side device 20 may recognize the I frame and perform the processing described in the first to the third embodiments. In other words, the operation of the reproduction side device 20 may be the same as that of any of the first to the third embodiments described above (the same goes for a fifth embodiment described later). Therefore, hereinafter, only an operation of the encoding side device 10 will be described.
<Overview of Operation Example 1 of Encoding Side Device 10 According to Fourth Embodiment>

Figure 23:
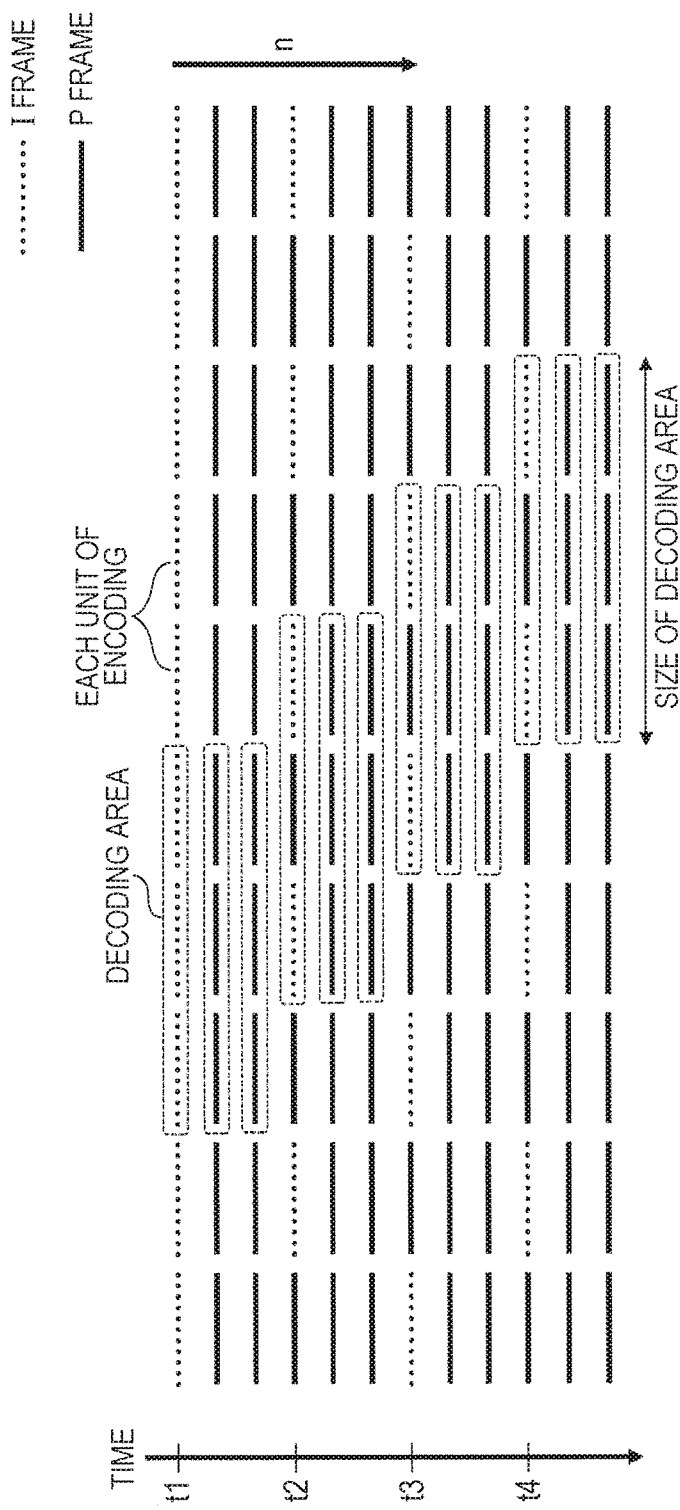
FIG. 23 is a diagram showing an overview of an operation example 1 of an encoding side device 10 and a reproduction side device 20 according to a fourth embodiment.

First, an overview of an operation example 1 of the encoding side device 10 according to the fourth embodiment will be described with reference to FIG. 23.

In the operation example 1, the encoding unit 103 of the encoding side device 10 shifts timing of encoding some of a plurality of small screen images as I frames.

The encoding unit 103 of the encoding side device 10 sets the timing of encoding odd-numbered small screen images from the left as I frames to the same timing as that in the first to the third embodiments described above, and encodes the small screen images at times t1 and t3 as I frames. On the other hand, the encoding unit 103 of the encoding side device 10 shifts the timing of encoding even numbered small screen images from the left as I frames, and encodes the small screen images at times t1, t2, and t4 as I frames.

In the first to the third embodiments described above, the encoding unit 103 of the encoding side device 10 defines the time interval of I frame as n, and encodes all the small screen images as I frames at that time interval. In this case, the decoding area determination unit 203 of the reproduction side device 20 can only redetermine a new decoding area at the time interval n.

On the other hand, in the operation example 1, the encoding unit 103 of the encoding side device 10 shifts the timing of encoding even-numbered small screen images from the left as I frames. Thereby, in the example of FIG. 23, the I frame appears at times t1, t2, t3, and t4, that is, at time interval n/2. Therefore, the decoding area determination unit 203 of the reproduction side device 20 can redetermine a new decoding area at the time interval n/2. Thus, while the encoding unit 103 of the encoding side device 10 hardly changes an average time interval of the I frame (the average time interval affects the encoding efficiency), the decoding area determination unit 203 of the reproduction side device 20 can redetermine a new decoding area at shorter intervals.
<Overview of Operation Example 2 of Encoding Side Device 10 According to Fourth Embodiment>

Figure 24:
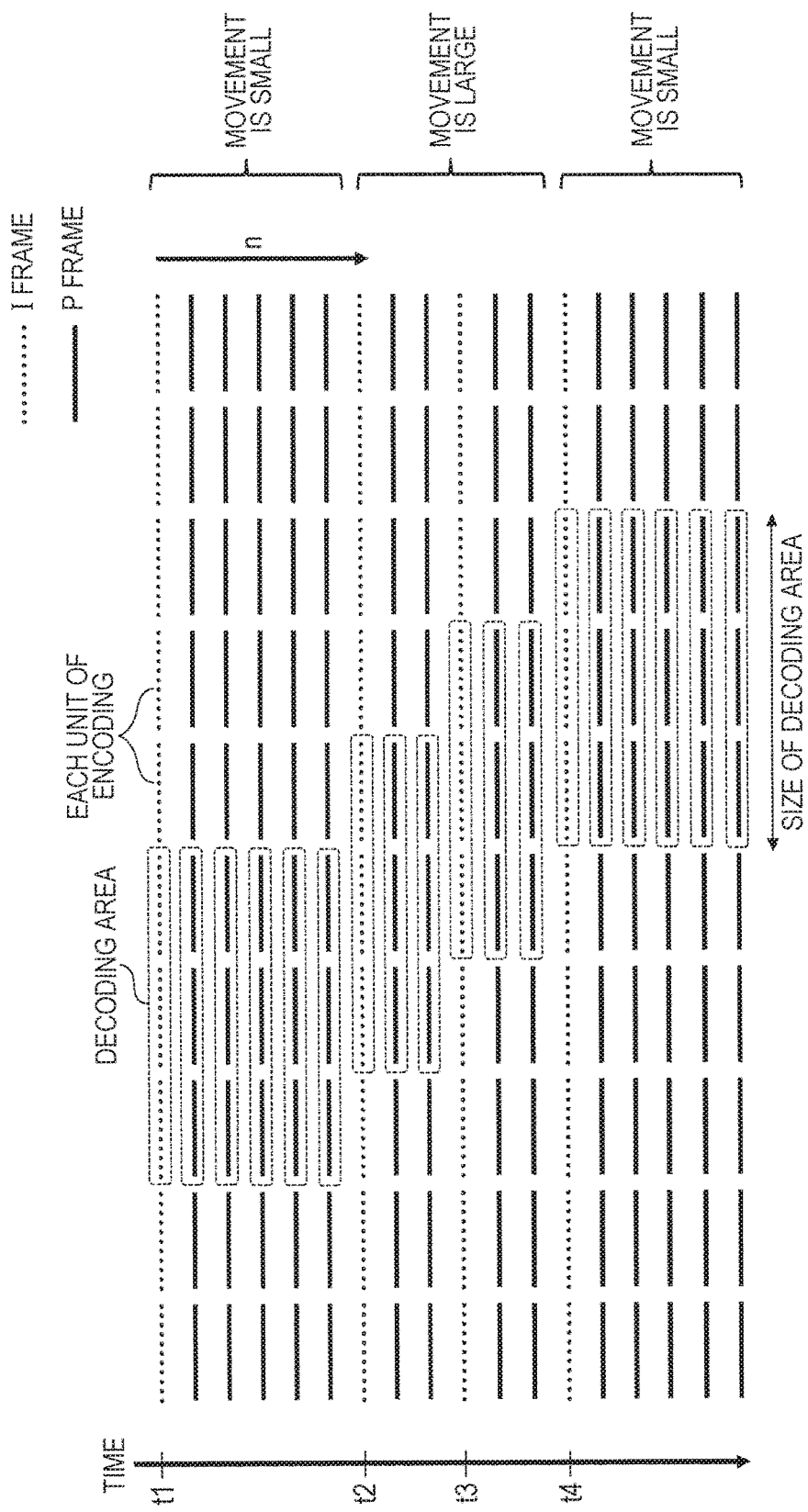
FIG. 24 is a diagram showing an overview of an operation example 2 of the encoding side device 10 and the reproduction side device 20 according to the fourth embodiment.

Subsequently, an overview of an operation example 2 of the encoding side device 10 according to the fourth embodiment will be described with reference to FIG. 24.

In the operation example 2, the encoding unit 103 of the encoding side device 10 dynamically changes the time interval of I frame based on a moving speed of an object in a moving image.

When performing encoding, the encoding unit 103 of the encoding side device 10 can know whether or not the moving speed of an object in a moving image is high. Regarding whether or not the moving speed of an object is high, for example, it is considered that the moving speed of an object is determined to be high when a threshold value is set and the moving speed of an object exceeds the threshold value. However, it is not limited thereto.

The encoding unit 103 of the encoding side device 10 defines the time interval of the I frame as n in a period in which the moving speed of an object is low, and encodes all the small screen images as I frames at the time interval n (times t1 and t4).

On the other hand, the encoding unit 103 of the encoding side device 10 defines the time interval of the I frame as n/2 in a period in which the moving speed of an object is high, and encodes all the small screen images as I frames at the time interval n/2 (times t2 and t3). Thereby, the decoding area determination unit 203 of the reproduction side device 20 can redetermine a new decoding area at shorter intervals.

In the operation example 2, the encoding unit 103 of the encoding side device 10 dynamically changes the time interval of I frame based on the moving speed of an object in a moving image. However, it is not limited thereto. For example, the encoding unit 103 of the encoding side device 10 may dynamically change the time interval of I frame by a request or the like from the reproduction side device 20.

(4-3) Effects of Fourth Embodiment

As described above, according to the fourth embodiment, the encoding side device 10 can change the time interval of I frame. Therefore, the encoding side device 10 can shift the time interval of I frame for some of a plurality of small screen images and dynamically change the time interval of I frame according to a moving speed of an object in a moving image. Thereby, the reproduction side device 20 can redetermine a new decoding area at shorter intervals. Therefore, when the movement amount (the moving speed) of the display area is large or the moving speed of an object is high, the reproduction side device 20 can determine a decoding area according to the movement amount or the moving speed. As a result, the reproduction side device 20 can move the display area at higher speed with the same size of decoding area. Further, it is possible to reduce the size of decoding area required to obtain the same movement amount (moving speed) of the display area. The other effect is the same as that of the first embodiment.

(5) Fifth Embodiment

In the first to the fourth embodiments described above, the encoding unit 103 of the encoding side device 10 performs encoding by handling each of a plurality of small screen images as an independent small screen image and applying inter-frame predictive encoding.

On the other hand, in the fifth embodiment, the encoding unit 103 of the encoding side device 10 encodes a small screen image by combining the inter-frame predictive encoding and predictive encoding between small screen images like MVC (Multiview Video Coding).

The MVC is disclosed in the following non-patent document.

Hideaki Kimata, "Trends of International Standardization of Three-dimensional Video Coding", NTT Technical Review, October 2011 Vol. 9 No. 10, <URL: https://www.ntt-review.jp/angtest/archive/ntttechnical.php?contents=nt r201110gls.html.>

A configuration of the fifth embodiment may be the same as that of any of the first to the fourth embodiments described above, so that its diagram and description will be omitted.

Hereinafter, an operation of the fifth embodiment will be described. However, an operation of the reproduction side device 20 may be the same as that of any of the first to the third embodiments as described above. Therefore, hereinafter, only an operation of the encoding side device 10 will be described. Here, an overview of an operation example of the encoding side device 10 according to the fifth embodiment will be described with reference to FIG. 25.

The encoding unit 103 of the encoding side device 10 classifies odd-numbered small screen images from the left among a plurality of small screen images into a base view. The encoding unit 103 of the encoding side device 10 encodes the small screen images classified into the base view by applying the inter-frame predictive encoding in the same manner as the first to the fourth embodiments. Specifically, the encoding unit 103 encodes the small screen images belonging to the base view as I frames at constant time intervals or encodes the small screen images as a P frame and a B frame that refer to the I frame and a P frame following the I frame.

On the other hand, the encoding unit 103 of the encoding side device 10 classifies even-numbered small screen, images from the left among the plurality of small screen images into a non-base view. The encoding unit 103 of the encoding side device 10 encodes the small screen images classified into the non-base view by applying the predictive encoding between small screen images. Specifically, the encoding unit 103 encodes all the small screen images belonging to the non-base view as a P frame and a B frame by referring to an I frame or a P frame belonging to a base view at the same time.

Figure 25:
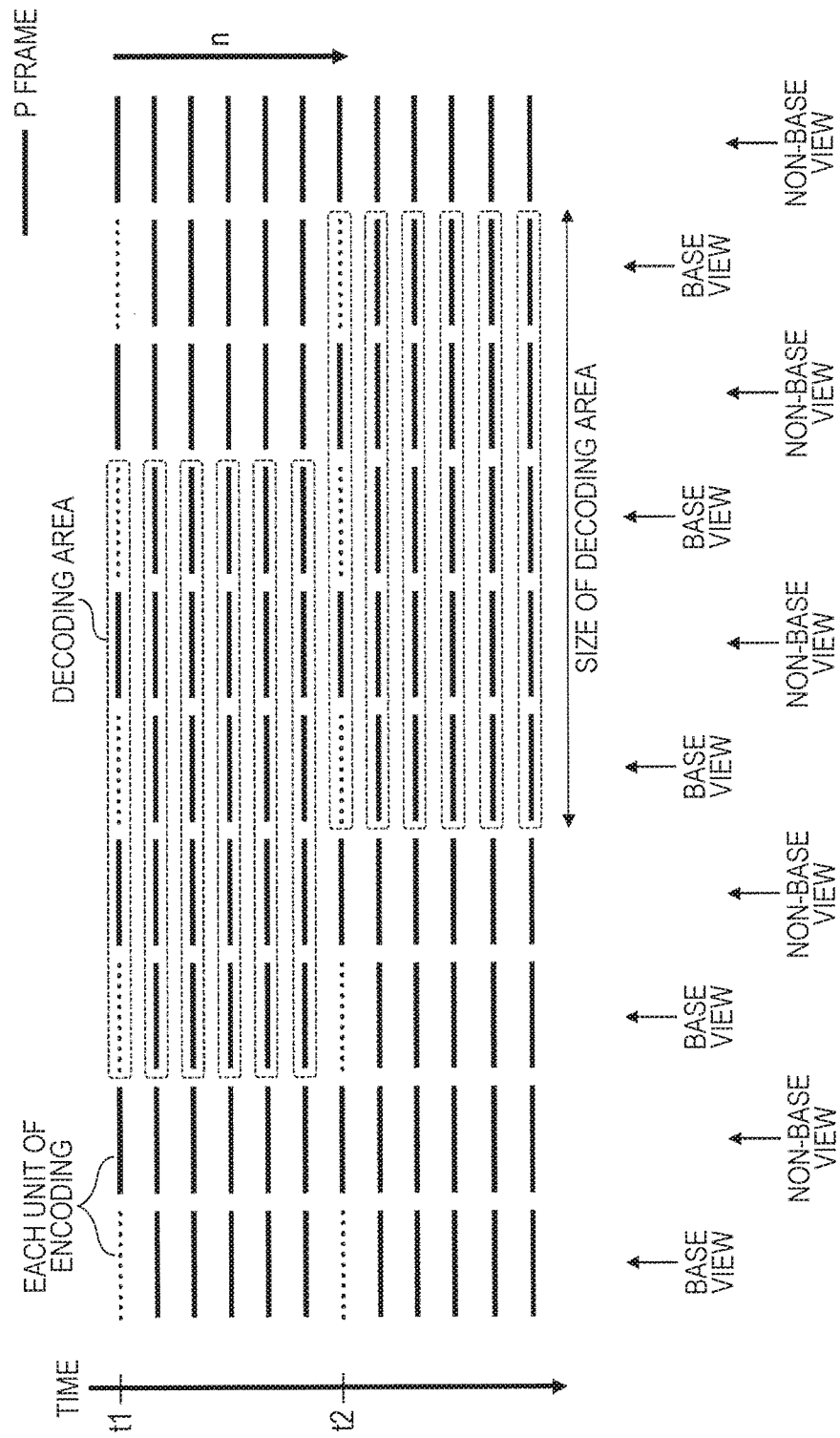
FIG. 25 is a diagram showing an overview of an operation example of an encoding side device 10 and a reproduction side device 20 according to a fifth embodiment.

In the example of FIG. 25, the I frame appears at time interval n, that is, at times t1 and t2, so that the decoding area determination unit 203 of the reproduction side device 20 redetermines a new decoding area. In the example of FIG. 25, the decoding area determination unit 203 of the reproduction side device 20 makes the size of the decoding area larger than that of the first to the fourth embodiments. However, it is not limited thereto.

In the fifth embodiment, it is possible to further improve the encoding efficiency by appropriately determining a positional relationship between the base view and the non-base view, a positional relationship of base view referred to by the non-base view, and the size of the decoding area.

As described above, according to the fifth embodiment, the encoding side device 10 encodes a small screen image by combining the inter-frame predictive encoding and the predictive encoding between small screen images like the MVC, so that it is possible to further improve the encoding efficiency of a moving image. The other effect is the same as that of the first embodiment

(6) Concept of First to Fifth Embodiments

Hereinafter, a configuration of a moving image processing system conceptually showing the above-described first to fifth embodiments will be described with reference to FIG. 26. The moving image processing system shown in FIG. 26 includes an encoding side device 80 and a reproduction side device 90. The encoding side device 80 corresponds to the encoding side device 10 and the reproduction side device 90 corresponds to the reproduction side devices 20, 20A, and 20B.

A plurality of temporally continuous whole images that form a moving image are sequentially inputted into the encoding side device 80, and the encoding side device 80 divides an inputted whole image into a plurality of small screen images, encodes the divided plurality of small screen images, and transmits the encoded plurality of small screen images to the reproduction side device 90. The reproduction side device 90 sequentially receives the whole image including a plurality of small screen images from the encoding side device 80 and decodes the received whole image.

The encoding side device 80 includes a dividing unit 801, an encoding unit 802, and a transmission unit 803. The dividing unit 801 corresponds to the small screen dividing unit 102, the encoding unit 802 corresponds to the encoding unit 103, and the transmission unit 803 corresponds to the data transmission unit 104. Configuration components of the encoding side device 80 can be realized by a semiconductor device.

A plurality of whole images are sequentially inputted into the dividing unit 801, and the dividing unit 801 divides an inputted whole image into a plurality of small screen images. The encoding unit 802 encodes the plurality of small screen images divided by the dividing unit 801. The transmission unit 803 transmits a whole image including a plurality of small screen images encoded by the encoding unit 802 to the reproduction side device 90.

The reproduction side device 90 includes a reception unit 901, a determination unit 903, and a decoding unit 902. The reception unit 901 corresponds to the data reception unit 201, the determination unit 903 corresponds to the decoding area determination unit 203, and the decoding unit 902 corresponds to the decoding unit 204. Configuration components of the reproduction side device 90 can be realized by a semiconductor device.

The reception unit 901 sequentially receives the whole image including a plurality of small screen images from the encoding side device 80. The determination unit 903 determines a decoding area which includes a small screen image to be decoded and which is included in the whole image. The decoding unit 902 decodes the small screen image in the decoding area which is determined by the determination unit 903 and which is included in the whole image received by the reception unit 901. Here, the determination unit. 903 determines a new decoding area when a small screen image of I frame appears in the decoding area.

The transmission unit 803 and the reception unit 901 can be formed by a circuit such as an antenna and a cable. The dividing unit 801, the encoding unit 802, the determination unit 903, and the decoding unit 902 may be realized in a software manner or may be formed by a hardware circuit in a hardware manner. Whether the encoding unit 802 and the decoding unit 902 are realized by software or hardware may be selected by, for example, considering a screen size and the like.

In the moving image processing system shown in FIG. 26, the reproduction side device 90 determines a new decoding area when a small screen image of I frame appears in the decoding area. Here, it is possible to quickly decode the small screen image of I frame in the decoding area. Further, it is possible to decode in advance a small screen image other than the I frame in the decoding area by referring to the I frame in the decoding area that is most recently determined. Thereby, even when the display area moves to another area in the decoding area, an image in the display area after the movement can be quickly displayed, so that it is possible to smoothly move the display area.

While the invention made by the inventors has been specifically described based on the embodiments, it is needless to say that the present invention is not limited to the embodiments and may be variously modified without departing from the scope of the invention.

For example, although the display unit is provided inside the reproduction side device in each embodiment described above, it is not limited thereto.

Further, although the moving image is 360-degree moving image or the like in each embodiment described above, it is not limited thereto. For example, when additional information (for example, traffic jam information) that varies in a time direction with respect to a map is added to the map and the map is used as a moving image, data where the additional information is added to the map is very huge data as a whole. Therefore, it is natural that the data where the additional information is added to the map is divided into a plurality of data to be encoded, so that the embodiments described above may be applied. Thereby, it is possible to display the data where the additional information is added to the map in real time without delay while smoothly moving the display area.

The components shown in the drawings as the encoding side device, the reproduction side device, and functional blocks that perform various processing in the reproduction side device in the embodiments described above can be formed by a processor 1001 such as a CPU (Central Processing Unit) that performs calculation processing, control processing, and the like, a program executed by the processor 1001, a memory 1002 that stores various data, and a circuit such as an interface (I/F) 1003 that inputs and outputs signals from and to the outside as hardware as shown in FIG. 27. Further, the components can be realized by a program read by the processor 1001 from the memory 1002 as software. Therefore, it should be understood by those skilled in the art that the functional blocks can be realized in various forms by only hardware, only software, or a combination of these, and the functional blocks are not limited to any one of hardware, software, and a combination of these.

The program described above can be stored in various types of non-transitory computer readable media and supplied to a computer. The non-transitory computer readable media include various types of tangible storage media. Examples of the non-transitory computer readable media include a magnetic recording medium (for example, flexible disk, magnetic tape, and hard disk drive) a magneto-optical recording medium (for example, magneto-optical disk), a CD-ROM (Compact Disc-Read Only Memory), a CD-R (CD-Recordable), a CD-R/W (CD-ReWritable), a semiconductor memory (for example, mask ROM, PROM (Programmable ROM), EPROM (Erasable PROM), flash ROM, RAM (Random Access Memory)). The program may be supplied to a computer by various types of transitory computer readable media. Examples of the transitory computer readable media include an electrical signal, an optical signal, and an electromagnetic wave. The transitory computer readable media can supply the program to a computer through a wired communication path such as an electrical wire and an optical fiber or a wireless communication path.

What is claimed is:

1. A semiconductor device that sequentially receives a plurality of whole images, each of which includes a plurality of small screen images and which are temporally continuous and form a moving image, and decodes a received whole image, the semiconductor device comprising:
   a receiver configured to receive the whole image including the small screen images; and
   one or more processors configured to
      determine a first decoding area which includes a small screen image to be decoded and which is included in the whole image,
      decode the small screen image in the first decoding area which is included in the whole image,
      determine a second decoding area when the small screen image of intra frame appears in the first decoding area,
      predict next and following display areas based on at least one of: a moving direction in which a current display area has moved from a previous display area, a history of display areas including the current display area of the semiconductor device, a history of display areas used by another, or the current display area and a direction of motion of an object in the moving image, and
      determine the new decoding area based on the predicted next and following display areas.

2. The semiconductor device according to claim 1, further comprising:
   an input unit to which an instruction of a display area which includes an image to be displayed and which is included in the whole image is inputted,
   wherein the determination unit determines the second decoding area based on the current display area.

3. The semiconductor device according to claim 2,
   wherein a size of the second decoding area is determined based on a movement amount by which the current display area has moved from a previous display area.

4. The semiconductor device according to claim 2,
   wherein a size of the second decoding area is determined based on a moving speed of an object in the moving image.

5. The semiconductor device according to claim 2,
   wherein an area, where the current display area is included and a margin is added to the current display area, and a specific area in the moving image, are determined as new decoding areas.

6. The semiconductor device according to claim 1,
   wherein the one or more processors are configured to predict the next and following display areas based on the moving direction in which the current display area has moved from the previous display area.

7. The semiconductor device according to claim 1,
   wherein the one or more processors are configured to predict the next and following display areas based on a history of display areas including the current display area of the semiconductor device.

8. The semiconductor device according to claim 1, wherein the one or more processors are configured to predict the next and following display areas based on the history of display areas used by another.

9. The semiconductor device according to claim 1, wherein the one or more processors are configured to predict the next and following display areas based on the current display area and the direction of motion of the object in the moving image.

10. A moving image processing system comprising:

an encoding side device into which a plurality of temporally continuous whole images that form a moving image are sequentially inputted and which divides an inputted whole image into a plurality of small screen images, encodes the divided small screen images, and transmits the encoded small screen images; and a reproduction side device that sequentially receives the whole image including the small screen images from the encoding side device and decodes the received whole image, wherein the encoding side device includes one or more processors configured to divide the whole image into the small screen images, and encode the small screen images, and a transmitter configured to transmit the whole image including the encoded small screen images to the reproduction side device, wherein the reproduction side device includes a receiver configured to receive the whole image from the encoding side device, and one or more processors configured to determine a first decoding area which includes a small screen image to be decoded and which is included in the whole image, that decode the small screen image in the first decoding area which is included in the whole image, and determine a second decoding area when a small screen image of intra frame appears in the first decoding area, predict next and following display areas based on at least one of: a moving direction in which a current display area has moved from a previous display area, a history of display areas including the current display area of the semiconductor device, a history of display areas used by another, or the current display area and a direction of motion of an object in the moving image, and determine the new decoding area based on the predicted next and following display areas.

11. The moving image processing system according to claim 10, wherein the encoding side device encodes all the small screen images as intra frames at constant time intervals.

12. The moving image processing system according to claim 10, wherein the encoding side device shifts timing of encoding some of the small screen images as intra frames.

13. The moving image processing system according to claim 10, wherein the encoding side device dynamically changes time interval of intra frame based on a moving speed of an object in the moving image and encodes all the small screen images as intra frames at the changed time intervals.

14. The moving image processing system according to claim 10, wherein the encoding side device:

classifies the small screen images into a base view or a non-base view, encodes small screen images belonging to the base view as intra frames or frames that refer to the intra frames, and encodes small screen images belonging to the non-base view by referring to the small screen images belonging to the base view.

* * * * *